United States Patent
Yamaguchi

(10) Patent No.: US 10,191,699 B2
(45) Date of Patent: Jan. 29, 2019

(54) IMAGE PROCESSING DEVICE WHICH CAN IMPROVE SECURITY AT MEETINGS

(71) Applicant: KONICA MINOLTA, INC., Chiyoda-ku, Tokyo (JP)

(72) Inventor: Takehisa Yamaguchi, Ikoma (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/701,581

(22) Filed: Sep. 12, 2017

(65) Prior Publication Data

US 2018/0074761 A1    Mar. 15, 2018

(30) Foreign Application Priority Data

Sep. 12, 2016    (JP) ................................ 2016-177560

(51) Int. Cl.
  *G06F 3/12*    (2006.01)

(52) U.S. Cl.
  CPC .......... *G06F 3/1236* (2013.01); *G06F 3/1222* (2013.01); *G06F 3/1238* (2013.01); *G06F 3/1286* (2013.01)

(58) Field of Classification Search
  None
  See application file for complete search history.

(56) References Cited

U.S. PATENT DOCUMENTS

| | | | | |
|---|---|---|---|---|
| 7,712,660 B2* | 5/2010 | Keohane | ............... | G06F 11/006 235/382 |
| 8,294,937 B2* | 10/2012 | Wakui | ................... | G06F 3/1219 358/1.1 |
| 8,477,936 B2* | 7/2013 | Takahashi | ............... | G06F 21/31 380/44 |
| 8,587,795 B2* | 11/2013 | Achiwa | ................. | G06F 3/1222 358/1.14 |
| 8,614,733 B2* | 12/2013 | Kato | ..................... | H04N 7/147 348/14.01 |
| 2008/0309970 A1* | 12/2008 | Kobayashi | ......... | H04N 1/00843 358/1.15 |
| 2009/0044251 A1* | 2/2009 | Otake | ................... | H04L 63/102 726/3 |
| 2010/0020345 A1* | 1/2010 | Achiwa | ................. | G06F 3/1222 358/1.14 |
| 2011/0063670 A1* | 3/2011 | Ito | ......................... | G06F 3/1204 358/1.15 |
| 2011/0283345 A1* | 11/2011 | Kamei | .................... | G06F 21/34 726/5 |
| 2012/0296979 A1* | 11/2012 | Iwai | ...................... | H04L 65/403 709/205 |

FOREIGN PATENT DOCUMENTS

JP    2014-002690 A    1/2014

* cited by examiner

*Primary Examiner* — Dung D Tran
(74) *Attorney, Agent, or Firm* — Buchanan Ingersoll & Rooney PC

(57) ABSTRACT

An MFP is an image processing device which can communicate with external devices such as other MFPs, biological information terminals, a meeting management server, portable terminal devices, and terminals, via network. The MFP prohibits transmitting data stored in the MFP to an external device connected to the network, not associated with at least attendees of the meeting, by an operation of the meeting attendees, when it is determined that the behavior state of the MFP satisfies a predetermined condition which relates to the meeting.

23 Claims, 28 Drawing Sheets

FIG. 7

RESERVATION TABLE 321

| MEETING ID | MEETING NAME | SCHEDULED START TIME DATE | SCHEDULED END TIME DATE | ATTENDEES (ATTRIBUTES) | RESERVED BY | MFP TO BE USED |
|---|---|---|---|---|---|---|
| 0025 | PRODUCT REVIEW | 2016.10.22 13:00 | 2016.10.22 15:00 | USER U1 (IN COMPANY)<br>USER U2 (IN COMPANY)<br>USER U3 (CHAIRPERSON, OUTSIDE COMPANY)<br>USER U4 (IN COMPANY) | USER U1 | MFP_A |
| 0026 | COUNTER-MEASURE REVIEW | 2016.10.23 10:30 | 2016.10.23 11:30 | USER U5 (CHAIRPERSON, OUTSIDE COMPANY)<br>USER U6 (IN COMPANY)<br>USER U7 (IN COMPANY) | USER U8 | MFP_B |
| 0027 | REGULAR MEETING | 2016.10.25 11:00 | 2016.10.25 12:00 | USER U11 (CHAIRPERSON, IN COMPANY)<br>USER U12 (IN COMPANY)<br>USER U13 (IN COMPANY) | USER U11 | MFP_A |
| ... | ... | ... | ... | ... | ... | ... |

FIG. 8

INDIVIDUAL RESERVATION TABLE (MFP_A) 121

| MEETING ID | MEETING NAME | SCHEDULED START TIME DATE | SCHEDULED END TIME DATE | ATTENDEES (ATTRIBUTES) | RESERVED BY |
|---|---|---|---|---|---|
| 0025 | PRODUCT REVIEW | 2016.10.22 13:00 | 2016.10.22 15:00 | USER U1 (IN COMPANY)<br>USER U2 (IN COMPANY)<br>USER U3 (CHAIRPERSON, OUTSIDE COMPANY)<br>USER U4 (IN COMPANY) | USER U1 |
| 0027 | REGULAR MEETING | 2016.10.25 11:00 | 2016.10.25 12:00 | USER U11 (CHAIRPERSON, IN COMPANY)<br>USER U12 (IN COMPANY)<br>USER U13 (IN COMPANY) | USER U11 |
| ... | ... | ... | ... | ... | ... |

| USER NAME | USER ID | PASSWORD | BIO TERMINAL IP ADDRESS | PORTABLE TERMINAL IP ADDRESS |
|---|---|---|---|---|
| USER U1 | 001 | smi129 | 192.168.1.6 | 192.168.1.23 |
| USER U2 | 002 | cdm807 | 192.168.1.11 | 192.168.1.21 |
| USER U3 | 003 | ksu921 | 192.168.1.2 | 192.168.1.51 |
| .... | .... | .... | .... | .... |

IMAGE PROCESSING DEVICE WHICH CAN IMPROVE SECURITY AT MEETINGS

The present U. S. patent application claims a priority under the Paris Convention of Japanese patent application No. 2016-177560 filed on Sep. 12, 2016, including description, claims, drawings, and abstract the entire disclosure is incorporated herein by reference in its entirety.

BACKGROUND

Technological Field

This invention relates to an image processing device and a control program for an image processing device. More specifically, this invention relates to an image processing device and a control program for an image processing device which can improve the security, when they are used at meetings.

Description of the Related Art

As electrophotography image forming apparatuses, there are an MFP (Multi Function Peripheral) having a scanner function, a facsimile function, a copying function, a function of a printer, a data transmitting function and a server function, a facsimile device, a copying machine, a printer, and so on. The image forming apparatuses are normally connected to networks, to be able to perform printing jobs by instructions from external devices.

As an image forming apparatus, there is an MFP which includes a touch panel display (an operation panel) having a display and a touch panel. According to the MFP which includes a touch panel display, a user can instruct execution of jobs such as printings and copies, via operations to the touch panel display. Along with the recent increase in display size, a structure in which a large touch panel display occupies the entirety of the top face of the MFP is proposed. According to such the MFP equipped with a large touch panel display, a plurality of users can operate the image forming apparatus simultaneously. By displaying a plurality of documents (images) on the touch panel display, a plurality of users can hold the meeting using their own documents.

For example, the below Document 1 discloses a technique which relates to an image forming apparatus equipped with a large touch panel display. The below Document 1 discloses a technique to automatically restrict the image forming function, when there is a potential for hindering the meeting or the like. According to the below Document 1, a first information processing apparatus transmits a restriction instruction to the image forming apparatus, when a predetermined application which displays images on the displaying device is to be started up. In response to receipt of the restriction instruction, the image forming apparatus restricts execution of the image forming process, by inhibiting or holding execution of the image forming job received from a second information processing apparatus, or by transferring the received image forming job to another image forming apparatus.

DOCUMENT(S) RELATED TO PATENT(S)

[Document 1] Japan Patent Publication No. 2014-2690

The conventional MFPs have a problem in which the security level is low. More specifically, when holding a meeting by using the large touch panel display of the MFP, the meeting attendees temporarily store documents which include secret information into the MFP, and display them on the large touch panel display. When the documents include secret information, there is a risk that the secret information leaks out from the MFP to an external device, by misoperation of the attendees.

SUMMARY

This invention is to solve the above problem. The object is to provide an image processing device and a control program for an image processing device which can improve the security, when they are used at meetings.

To achieve at least one of the abovementioned objects, according to an aspect of the present invention, an image processing device reflecting one aspect of the present invention can communicate with an external device via a network, comprises a hardware processor that: determines whether a behavior state of the image processing device satisfies a predetermined condition which relates to a meeting, and prohibits transmitting data stored in the image processing device to the external device connected to the network, not associated with at least attendees of the meeting, by an operation of the meeting attendees, when it is determined that the behavior state of the image processing device satisfies the predetermined condition which relates to the meeting.

According to an aspect of the present invention, a non-transitory computer-readable recording medium storing a controlling program for an image processing device which can communicate with an external device via a network, wherein the program causing a computer to: determines whether a behavior state of the image processing device satisfies a predetermined condition which relates to a meeting, and prohibits transmitting data stored in the image processing device to an external device connected to the network, not associated with at least attendees of the meeting, by an operation of the meeting attendees, when it is determined that the behavior state of the image processing device satisfies the predetermined condition which relates to the meeting.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 schematically shows the reservation table stored in meeting management server 300, according to the embodiment of this invention.

FIG. 8 schematically shows the individual reservation table 121 stored in MFP 100-1, according to the embodiment of this invention.

FIG. 28 schematically shows user information table 122 stored in MFP 100-1, according to the embodiment of this invention.

DETAILED DESCRIPTION OF EMBODIMENTS

Hereinafter, one or more embodiments of the present invention will be described with reference to the drawings. However, the scope of the invention is not limited to the disclosed embodiments. In the followings, the embodiment of this invention will be explained based on the Figures.

In the following embodiments, a case in which the image processing device is an MFP will be explained. The image processing device may be an image forming apparatus such as a printer, a copying machine, and a 120 facsimile, other than an MFP. The image processing device may be a PC (Personal Computer), a cellular phone, a smart phone, or the like.

[The Structure of the Meeting System]

Firstly, the structure of the meeting system according to the embodiment will be explained.

Figure 1:
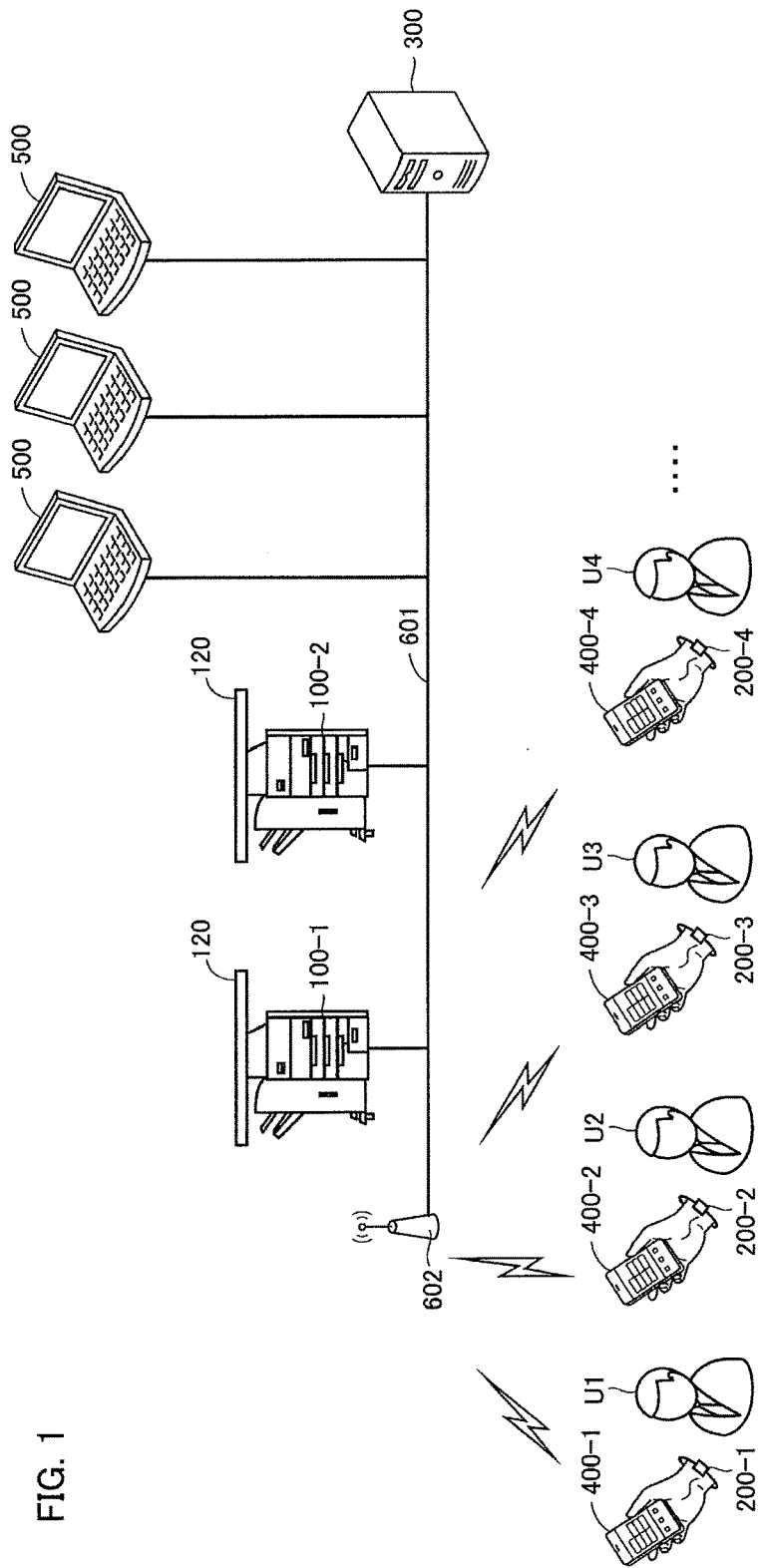
FIG. 1 conceptually shows a structure of a meeting system, according to an embodiment of this invention.

FIG. 1 conceptually shows a structure of a meeting system, according to an embodiment of this invention.

Referring to FIG. 1, the meeting system according to the embodiment is equipped with MFPs 100-1 (an example of an image processing device) and 100-2 (hereinafter they may be collectively referred to as MFP 100), biological information terminals 200-1, 200-2, 200-3 and 200-4 (hereinafter they may be collectively referred to as biological information terminal 200), meeting management server 300, portable terminal devices 400-1, 400-2, 400-3 and 400-4 (hereinafter they may be collectively referred to as portable terminal device 400), and a plurality of terminals 500. Each of MFPs 100, each of biological information terminals 200, meeting management server 300, each of portable terminal devices 400, and each of terminals 500 are mutually connected with each other via network 601, to perform communication mutually. Especially, each of biological information terminal 200 and portable terminal device 400 executes wireless communication bilaterally with other equipments, by performing wireless communication with access point 602 which is connected to network 601.

Network 601 is a LAN (Local Area Network), a WAN (Wide Area Network), or the like. Network 601 connects various equipments by using protocol of TCP/IP (Transmission Control Protocol/Internet Protocol). The equipments connected to network 601 can receive and send various data with each other. The meeting system may have equipments connected to network 601 other than the above mentioned equipments.

Users U1, U2, U3 and U4 can use MFP 100. Biological information terminals 200-1, 200-2, 200-3 and 200-4 are carried by and attached to users U1, U2, U3 and U4, respectively. Portable terminal devices 400-1, 400-2, 400-3, and 400-4 are carried by users U1, U2, U3, and U4, respectively. MFP 100 includes a touch panel display 120 having a big screen on the top face.

Figure 2:
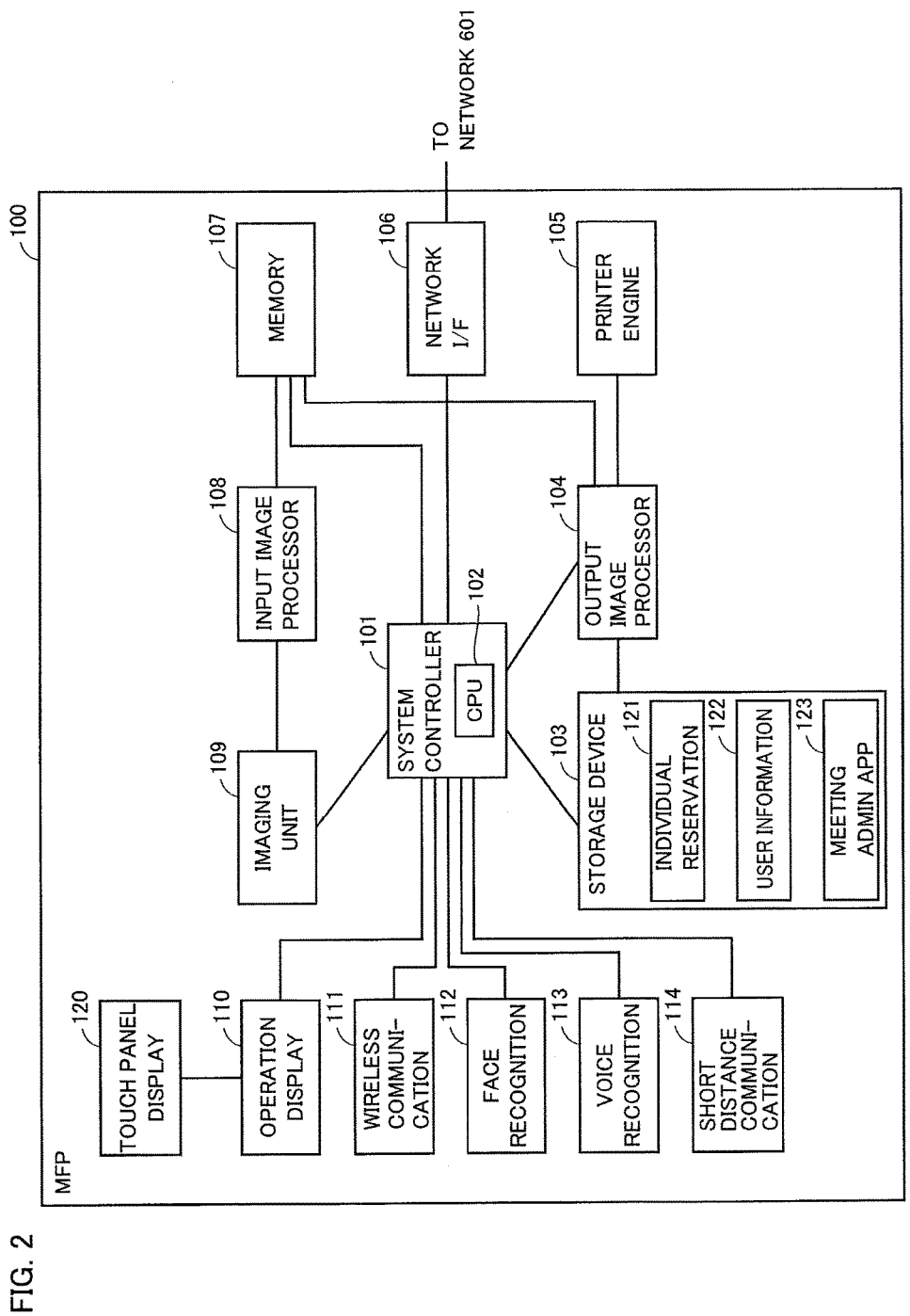
FIG. 2 shows a block diagram indicating a hardware configuration of MFP 100, according to the embodiment of this invention.

FIG. 2 shows a block diagram indicating a hardware configuration of MFP 100, according to the embodiment of this invention.

Referring to FIG. 2, MFP 100 includes system controller 101, storage device 103, output image processing unit 104, printer engine 105, network interface 106, memory 107, input image processing unit 108, imaging unit 109, operation display unit 110, wireless communication control unit 111, face recognition unit 112, voice recognition unit 113, and short distance wireless communication unit 114. System controller 101, storage device 103, output image processing unit 104, printer engine 105, network interface 106, memory 107, input image processing unit 108, imaging unit 109, operation display unit 110, wireless communication control unit 111, face recognition unit 112, voice recognition unit 113, and short distance wireless communication unit 114 are mutually connected with each other.

System controller 101 controls the entirety of MFP 100. System controller 101 includes a CPU (Central Processing Unit) 102. CPU 102 works in accordance with control programs stored in memory 107 and storage device 103.

Storage device 103 is a subsidiary storage device having large capacity such as a HDD (Hard Disk Drive), for example. Storage device 103 stores control programs executed by CPU 102, individual reservation table 121, user information table 122, application 123 for meeting administration, or the like, which will be explained later. User information table 122 is information to associate users who can use the machine, IP (Internet Protocol) addresses of biological information terminals 200 attached to the users, and IP (Internet Protocol) addresses of portable terminal devices 400 which are possessed by the users with each other. Storage device 103 includes boxes which are areas in which the users of MFP 100 can store data freely.

Output image processing unit 104 processes image data to generate printing data.

Printer engine 105 prints printing data generated by output image processing unit 104 onto sheets. Printer engine 105 is roughly configured with a toner image forming unit, a fixing device, a sheet conveying unit, and so on. Printer engine 105 forms an image on the sheet by electrophotographic technology, for example. The toner image forming unit synthesizes a four-colored image by so-called a tandem system to form a color image on a sheet. The toner image forming unit is configured with photo conductors for colors of C (cyan), M (magenta), Y (yellow), and K (black), an intermediate transfer belt onto which toner images are transferred (the primary transfer) from the photo conductors, a transfer unit to transfer images from the intermediate transfer belt to sheets (the secondary transfer), and so on. The fixing device has a heating roller and a pressure roller. The fixing device pinches and conveys a sheet on which a toner image was formed by the heating roller and the pressure roller, to heat and apply pressure on the sheet. Herewith, the fixing device melts toner adhered to the sheet, to fix it on the sheet and form an image on the sheet. The sheet conveying unit consists of paper feeding rollers, conveying rollers, motors for driving the rollers, and so on. The sheet conveying unit feeds a paper sheet from the paper feeding cartridge, to convey it in the inner part of the chassis of MFP 100. The sheet conveying unit discharges sheets on which images were formed from the chassis of MFP 100 onto the copy receiving tray or the like.

Network interface 106 performs communication with external devices via network 601, under control of system controller 101.

Memory 107 is a main storage device, which includes a RAM (Random Access Memory), a ROM (Read Only Memory), and so on. The RAM of memory 107 temporarily stores various information such as images. The ROM of memory 107 stores control programs.

Input image processing unit 108 processes input image data read by imaging unit 109.

Imaging unit 109 reads images.

Operation display unit 110 displays various information on touch panel display 120. Operation display unit 110 receives various operations via touch panel display 120.

Wireless communication control unit 111 executes wireless communication with biological information terminal 200, portable terminal device 400, and so on via access point 602, and receives radio waves of the iBeacon from biological information terminal 200, portable terminal device 400, and so on.

Face recognition unit 112 take a picture of the face and the whole image of a user, to perform the face recognition and the feature point discrimination, and recognizes the user.

Voice recognition unit 113 performs the voice print analysis based on the user's voice, to recognize the user. Voice recognition unit 113 identifies the input voice, and configures items of the menu or the like linked with the recognized voice words.

Short distance wireless communication unit 114 performs short distance wireless communication with biological information terminal 200, portable terminal device 400, and so on, based on the short distance wireless communication standard such as the NFC (Near Field Communication) and the Bluetooth (a registered trademark). The short distance wireless communication is direct wireless communication without access point 602.

The illustration and explanation of the facsimile function of MFP 100 are omitted. When MFP 100 works as a printer, the images are printed by printer engine 105. When MFP 100 works as a copying machine, the images read by imaging unit 109 are printed by printer engine 105. Operation display unit 110 accepts various instructions and data inputs from operators, and performs various displays.

Figure 3:
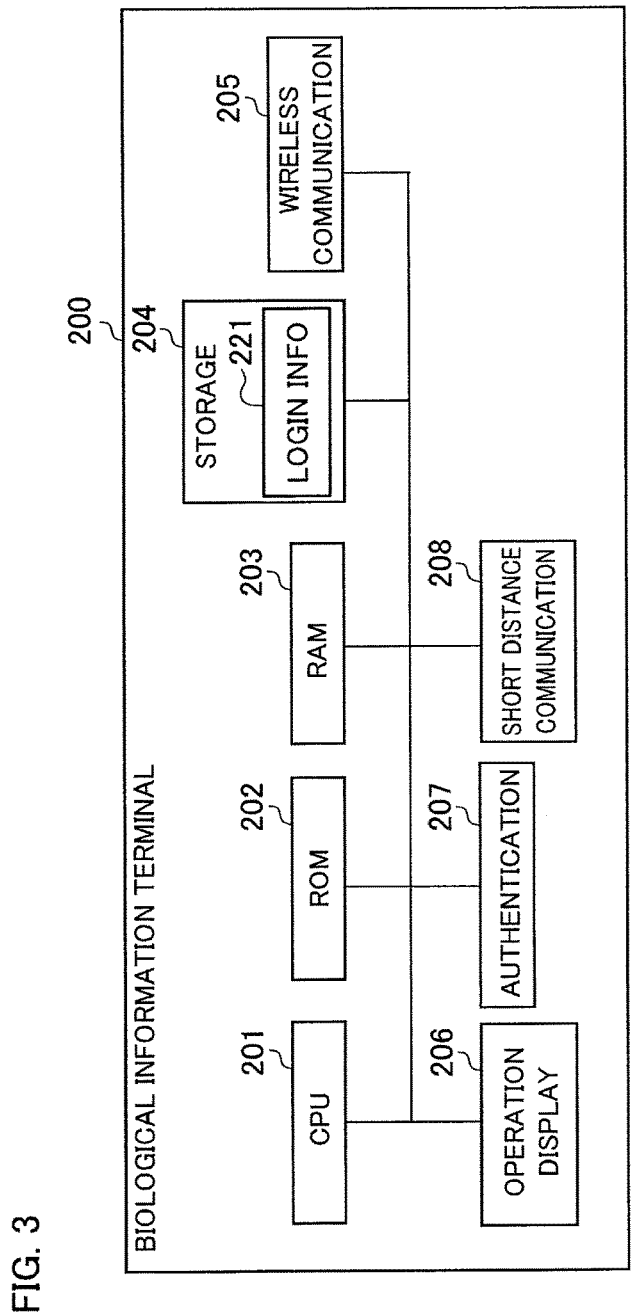
FIG. 3 shows a block diagram indicating a hardware configuration of biological information terminal 200, according to the embodiment of this invention.

FIG. 3 shows a block diagram indicating a hardware configuration of biological information terminal 200, according to the embodiment of this invention.

Referring to FIG. 3, biological information terminal 200 is worn on the body of a user such as a user's hands and arms. Biological information terminal 200 includes CPU 201, ROM 202, RAM 203, storage device 204, wireless communication unit 205, operation display unit 206, authentication unit 207, and short distance wireless communication unit 208. CPU 201 is connected with each of ROM 202, RAM 203, storage device 204, wireless communication unit 205, operation display unit 206, authentication unit 207, and short distance wireless communication unit 208 via a bus.

CPU 201 controls the entire behavior of biological information terminal 200. CPU 201 executes processes based on control programs.

ROM 202 stores control programs executed by CPU 201, and so on.

RAM 203 is a working memory for CPU 201, to temporarily store various information.

Storage device 204 is a subsidiary storage device, for example, a HDD or the like. Storage device 204 stores various information such as information necessary for the biometric authentication of the user who wears biological information terminal 200 (for example, the vein pattern used for the vascular authentication), and login information 221 of the user of biological information terminal 200. Login information 221 is necessary when the user who wears biological information terminal 200 logs in another equipment, and includes the user ID, the password and so on.

Wireless communication unit 205 transmits and receives various kinds of information with other equipments such as MFP 100, via access point 602.

Operation display unit 206 displays various information, and receives various operations from the user of biological information terminal 200.

Authentication unit 207 biometrically authenticates a user who wears biological information terminal 200. The method of the biometric authentication is the vascular authentication, the pulse wave authentication, the fingerprint authentication, the iris authentication, or the like, using physical features.

Short distance wireless communication unit 208 executes short distance wireless communication with MFP 100 or the like.

When a user who wears biological information terminal 200 approaches MFP 100, biological information terminal 200 transmits login information 221 to MFP 100 by the short distance wireless communication. MFP 100 executes the login process for the user, based on the received information. Herewith, the user who wears biological information terminal 200 can use MFP 100 without login operations.

Figure 4:
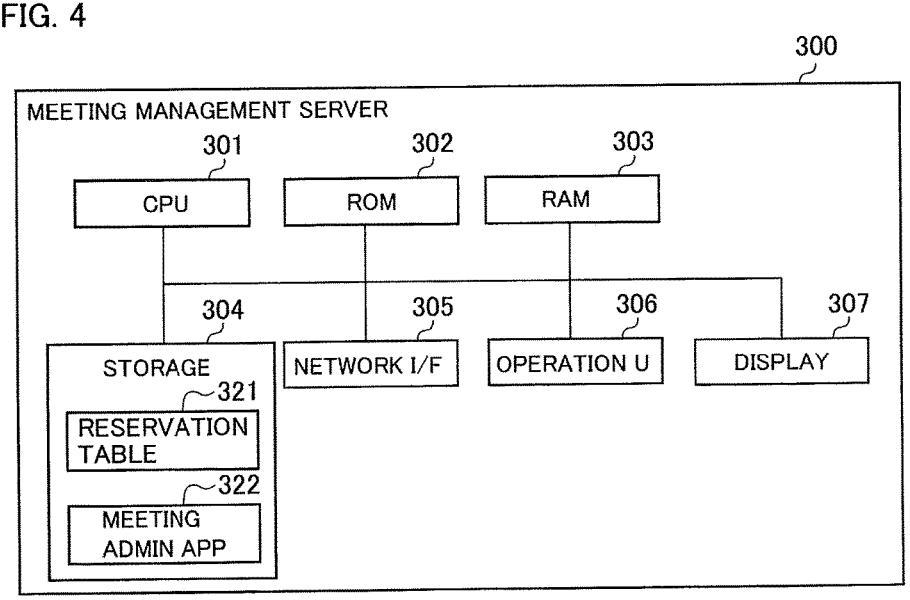
FIG. 4 shows a block diagram indicating a hardware configuration of meeting management server 300, according to the embodiment of this invention.

FIG. 4 shows a block diagram indicating a hardware configuration of meeting management server 300, according to the embodiment of this invention.

Referring to FIG. 4, meeting management server 300 is a PC or the like, and includes CPU 301, ROM 302, RAM 303, storage device 304, network interface 305, operation unit 306, display unit 307, and so on. CPU 301 is connected with each of ROM 302, RAM 303, storage device 304, network interface 305, operation unit 306, and display unit 307, via a bus.

CPU 301 controls entire meeting management server 300. CPU 301 executes control programs stored in ROM 302.

ROM 302 is a flash ROM, for example. ROM 302 stores various programs executed by CPU 301, and various fixed data. ROM 302 may be not rewritable.

RAM 303 is a main memory for CPU 301. RAM 303 is used to temporarily store data necessary when CPU 301 executes control programs and so on.

Storage device 304 is a subsidiary storage device such as a HDD, to store various data such as reservation table 321, and application (program) 322 for meeting administration which will be explained later.

Network interface 305 performs communication with other equipments on a communications protocol such as TCP/IP, in accordance with instructions from CPU 301.

Operation unit 306 receives various instructions from users.

Display unit 307 displays various information.

Since the structure of terminal 500 is almost similar to the structure of meeting management server 300, except that terminal 500 does not store reservation table 321 and application for meeting administration 322, the explanation is not repeated.

Meeting management server 300 may be included in any of MFPs 100. In this instance, reservation table 321 and the application for meeting administration 322 are stored in MFP 100 which includes meeting management server 300.

Figure 5:
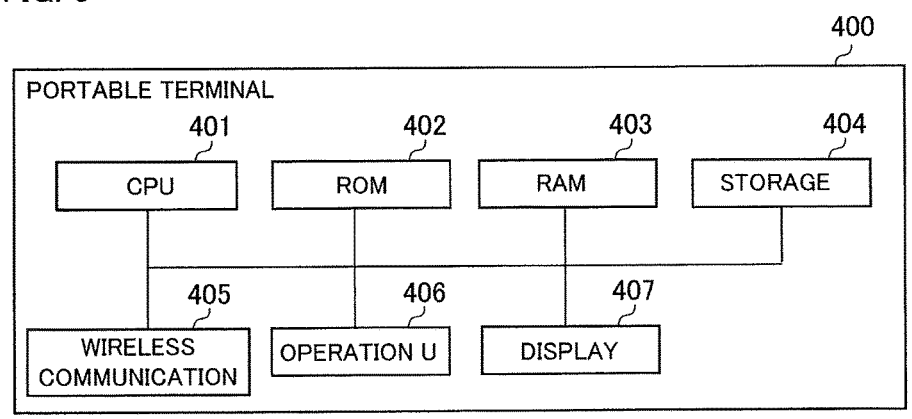
FIG. 5 shows a block diagram indicating a structure of a portable terminal device 400, according to the embodiment of this invention.

FIG. 5 shows a block diagram indicating a structure of a portable terminal device 400, according to the embodiment of this invention.

Referring to FIG. 5, portable terminal device 400 includes CPU 401, ROM 402, RAM 403, storage device 404, wireless communication unit 405, operation unit 406, and display unit 407. CPU 401 is connected with each of ROM 402, RAM 403, storage device 404, wireless communication unit 405, operation unit 406, and display unit 407, via a bus.

CPU 401 controls entire portable terminal device 400. CPU 401 executes control programs stored in ROM 402.

ROM 402 is a flash ROM, for example. ROM 402 stores various programs to make portable terminal device 400 work, and so on.

RAM 403 is a main memory for CPU 401. RAM 403 is used to temporarily store data necessary when CPU 401 executes control programs, for example.

Storage device 404 is a subsidiary storage device such as a HDD, to store various data.

Wireless communication unit 405 transmits and receives various kinds of information with other equipments such as MFP 100, via access point 602.

Operation unit 406 receives various instructions which relate to portable terminal device 400, from the user.

Display unit 407 displays various information which relates to portable terminal device 400.

[The Behavior of the Meeting System, when Accepting a Reservation for a Meeting]

Next, the behavior of the meeting system when accepting a reservation for a meeting will be explained. Here, a case in which a meeting using MFP 100-1 is reserved will be explained.

Figure 6:
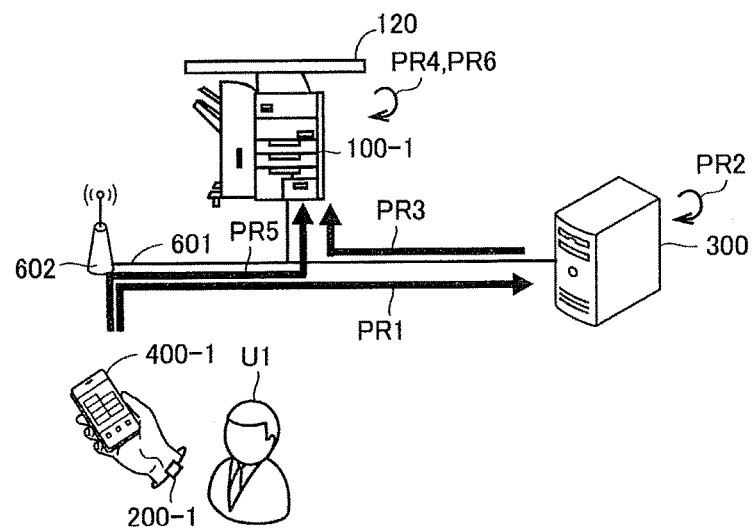
FIG. 6 schematically shows the behavior of the meeting system when accepting a reservation for a meeting, according to the embodiment of this invention.

FIG. 6 schematically shows the behavior of the meeting system when accepting a reservation for a meeting, according to the embodiment of this invention.

Referring to FIG. 6, user U1 who reserves a meeting accesses meeting management server 300 from portable terminal device 400-1 or the like, and inputs the meeting information (process PR1).

When meeting management server 300 receives the input of the meeting information, meeting management server 300 stores the input meeting information on the reservation table 321 (process PR2). Herewith, meeting management server 300 receives the reservation for the meeting. When meeting management server 300 receives the input of the meeting information, meeting management server 300 transmits the input meeting information to MFP 100 used for the meeting (MFP 100-1 in this case) (process PR3). MFP 100-1 stores the received meeting information in the individual reservation table 121, and generates folders for the meeting attendees in the box (process PR4).

Before the scheduled start time and date of the meeting, the meeting attendees access MFP 100 from portable terminal device 400-1 or the like, to perform operation for storing the meeting material (an example of data used for the meeting) (process PR5). When MFP 100-1 receives an operation for storing the meeting material by the predetermined reception deadline for material (for example, the scheduled start time and date of the meeting), MFP 100-1 encrypts the acquired meeting material and stores (memorizes) the encrypted data into the attendees folder of the box. When MFP 100 stores the encrypted data, MFP 100 sets the expiration date for the encrypted data (process PR6).

In each of the processes PR1 and PR5, user U1 may access meeting management server 300 from terminal 500, MFP 100, or the like, as substitute for portable terminal device 400-1. In process PR3, the timing (timing of process PR3) at which meeting management server 300 transmits the meeting information may be before the scheduled start time and date of the meeting. In process PR5, MFP 100-1 may receive directly the registering of the meeting information from user U1, without meeting management server 300.

FIG. 7 schematically shows the reservation table stored in meeting management server 300, according to the embodiment of this invention. In FIGS. 7 and 8, MFP 100-1 is denoted by "MFP_A", and MFP 100-2 is denoted by "MFP_B".

Referring to FIG. 7, on the reservation table, the meeting information input into meeting management server 300 is described. Each of pieces of the meeting information described on the reservation table includes information of the meeting ID (Identification) for the meeting, the meeting name, the scheduled start time and date, the scheduled end time and date, the attendees and the attributes, the person who made the reservation, and the MFP which is to be used for the meeting.

More specifically, the meeting named as "the product review", to which the meeting ID "0025" is assigned, is understood as the meeting of which the scheduled start time and date is "Oct. 22, 2016 13:00" and the scheduled end time and date is "Oct. 22, 2016 15:00". Further, it can be understood as the meeting registered by "user U1", and will be held with using "MFP 100_A". Further, it is understood that the meeting attendees are "user U1", "user U2" and "user U4" who are persons in the company, and "user U3" who is a person outside the company, and the chairperson is "user U3".

The meeting ID in the meeting information is assigned by meeting management server 300, when accepting the registration of the meeting. The meeting name, the scheduled start time and date, the scheduled end time and date, the attendees and the attributes, the chairperson, and the person who made the reservation are input by the user of MFP 100.

In this embodiment, as the attendee's attribute, whether an attendee is a person outside the company (outside the company in which MFP 100-1 is installed) or a person in the company is indicated. The attendee's attribute may be the department or the like in the company. A person outside the company (a person who should pay attention exceedingly to security of the material used during the meeting) is preferably elected as the chairperson of the meeting.

When meeting management server 300 accepts the reservation for the meeting, meeting management server 300 transmits the input meeting information to the MFP 100 denoted in the item "MFP to be used".

FIG. 8 schematically shows the individual reservation table 121 stored in MFP 100-1, according to the embodiment of this invention.

Referring to FIG. 8, the individual reservation table 121 shows the meeting information for meetings scheduled to be held by using oneself (MFP 100-1, in this example). The items of the meeting information described in the individual reservation table 121 are the same as the items of the meeting information described in the reservation table 321, except that there is not an item for a MFP to be used for the meeting in the individual reservation table 121.

Figure 9:
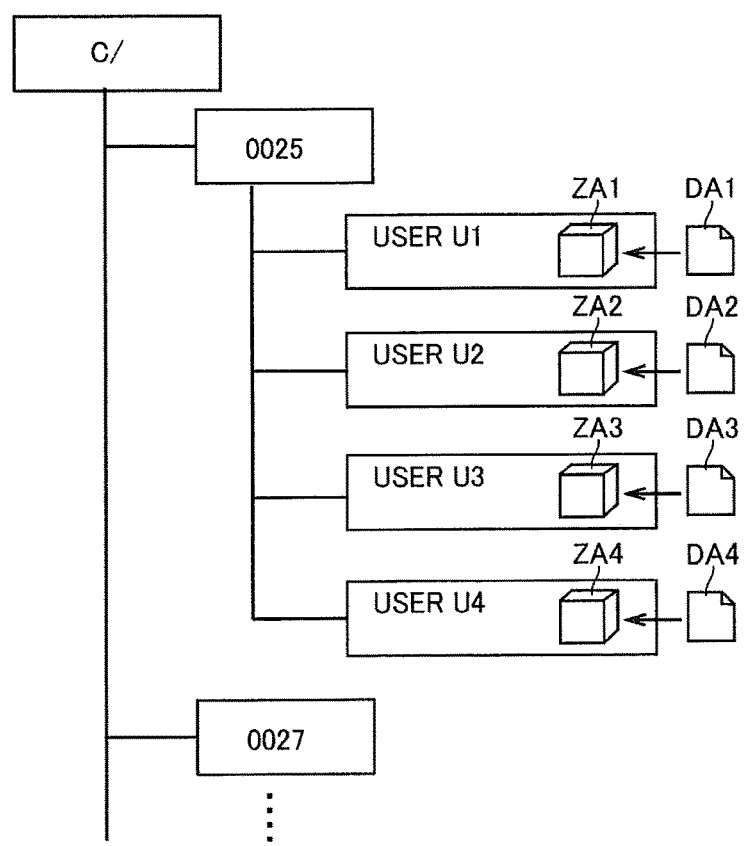
FIG. 9 is for explanation pertaining to processes PR4 and PR6 of FIG. 6 in detail, according to the embodiment of this invention.

FIG. 9 is for explanation pertaining to processes PR4 and PR6 of FIG. 6 in detail, according to the embodiment of this invention.

Referring to FIG. 9, in process PR4, when MFP 100-1 receives the meeting information having the meeting ID "0025" in FIG. 8, MFP 100-1 generates a folder having the folder name "0025" which is the meeting ID, in the box of storage device 103. Next, MFP 100-1 generates folders having folder names "user U1", "user U2", "user U3" and "user U4" which are the names of the meeting attendees, in the holder having the folder name "0025".

In process PR6, when MFP 100-1 accepts an operation for storing material DA1 of the meeting attendee "user U1" of the meeting ID "0025" in FIG. 8, MFP 100-1 encrypts material DA1 and stores the encrypted data ZA1 in the folder "user U1" in the folder "0025". Similarly, when MFP 100-1 accepts operations for storing material DA2 of the meeting attendee "user U2", material DA3 of "user U3", and material DA4 of "user U4" of the meeting ID "0025" in FIG. 8, MFP 100-1 encrypts each of materials DA2, DA3 and DA4, and stores encrypted data ZA2, ZA3 and ZA4 in folders "user U2", "user U3" and "user U4" in the folder "0025" respectively. The contents of materials DA1, DA2, DA3 and DA4 may be same. The contents of materials DA1, DA2, DA3 and DA4 may be different from each other.

In this manner, when an operation for storing the meeting material was accepted, it is possible to prevent the situation in which a person other than the attendees views the attendee's material between storing the material and the start of the meeting, by storing the material encrypted.

MFP 100-1 may set the expiration date for data ZA1, ZA2, ZA3, and ZA4, and may delete data ZA1, ZA2, ZA3, and ZA4 when the expiration date is reached.

Figure 10:
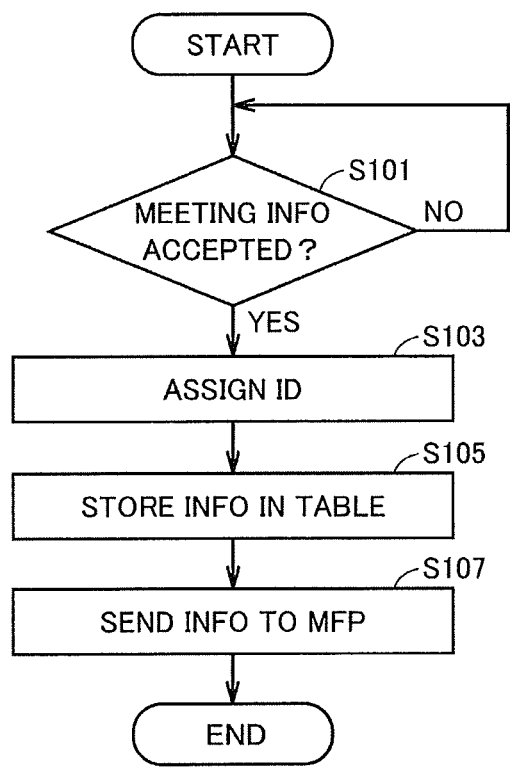
FIG. 10 shows a flowchart of the behavior of meeting management server 300, when accepting a reservation for a meeting, according to the embodiment of this invention.

FIG. 10 shows a flowchart of the behavior of meeting management server 300, when accepting a reservation for a meeting, according to the embodiment of this invention. This flowchart is executed based on application 322 for meeting administration.

Referring to FIG. 10, CPU 301 of meeting management server 300 determines whether the meeting information input was accepted or not (S101). Until it is determined that the meeting information input was accepted, CPU 301 continues the process of step S101.

At step S101, when it is determined that the meeting information input was accepted (YES at S101), CPU 101 assigns a meeting ID to the meeting information (S103), and registers the meeting information into the reservation table (S105). Next, CPU 301 transmits the meeting information to the MFP 100 used for the meeting (S107), and terminates the process.

Figure 11:
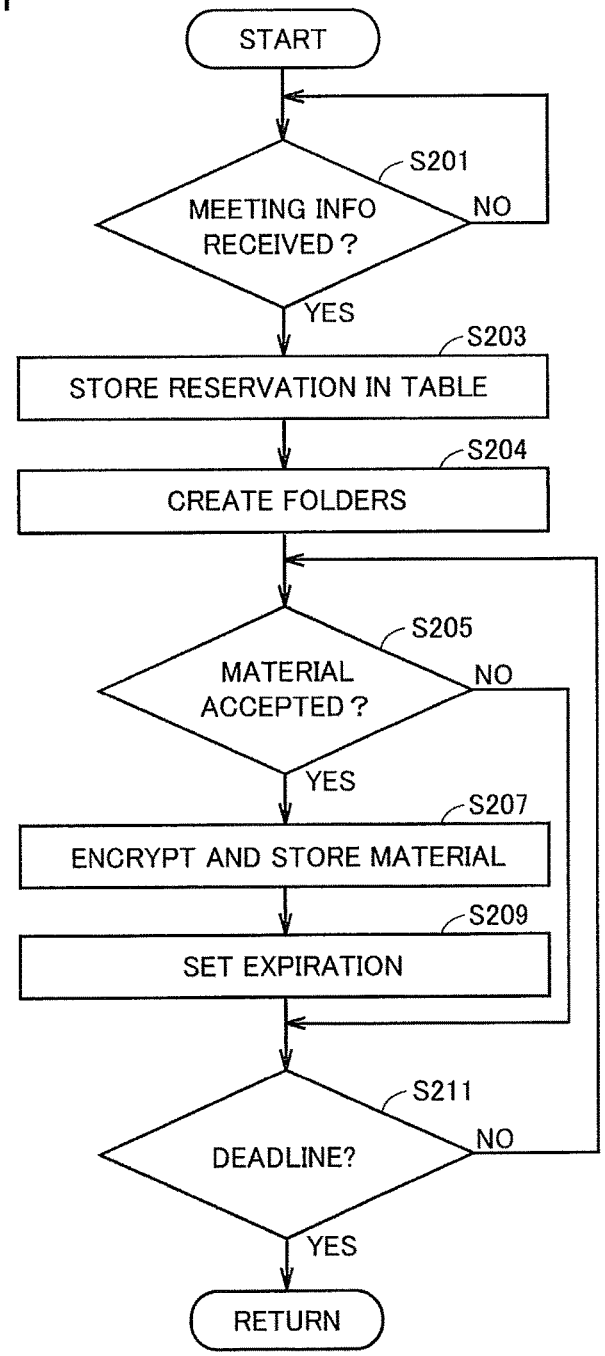
FIG. 11 shows a flowchart indicating the behavior of MFP 100, when receiving the meeting information, according to the embodiment of this invention.

FIG. 11 shows a flowchart indicating the behavior of MFP 100, when receiving the meeting information, according to the embodiment of this invention. This flowchart is executed based on application 123 for meeting administration.

Referring to FIG. 11, CPU 102 of MFP 100 determines whether the meeting information is received or not (S201). Until it is determined that the meeting information was received, CPU 102 continues the process of step S201.

At step S201, when it is determined that the meeting information was received (YES at S201), CPU 102 stores the meeting information in the individual reservation table (S203), and generates folders for the meeting attendees in the box (S204). Next, CPU 102 determines whether an operation for storing material was accepted or not (S205).

At step S205, when it is determined that an operation for storing material was not accepted (NO at S205), CPU 102 steps in the process of step S211.

At step S205, when it is determined that an operation for storing material was accepted (YES at S205), CPU 102 encrypts the material and stores it in the folder (S207), sets the expiration date to the material (S209), and steps in the process of step S211.

At step S211, CPU 102 determines whether the reception deadline of material expired or not (S211). At step S213, when it is determined that the reception deadline of material does not expire (NO at S211), CPU 102 steps in the process of step S205. On the other hand, at step S211, when it is determined that the reception deadline of material expired (YES at S211), CPU 102 terminates the process.

[The Behavior of the Meeting System at the Time of the Meeting]

Next, the behavior of the meeting system at the time of the meeting will be explained. In the followings, the behavior of the meeting system at the time of the meeting of the meeting ID "0025" in FIG. 8 will be explained.

Figure 12:
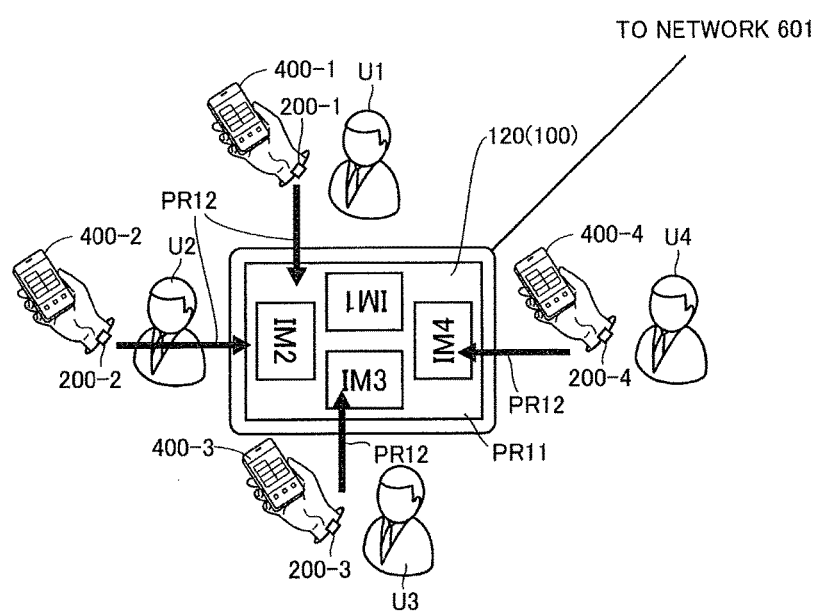
FIGS. 12 and 13 schematically show the behavior of the meeting system at the start of the meeting, according to the embodiment of this invention.
Figure 13:
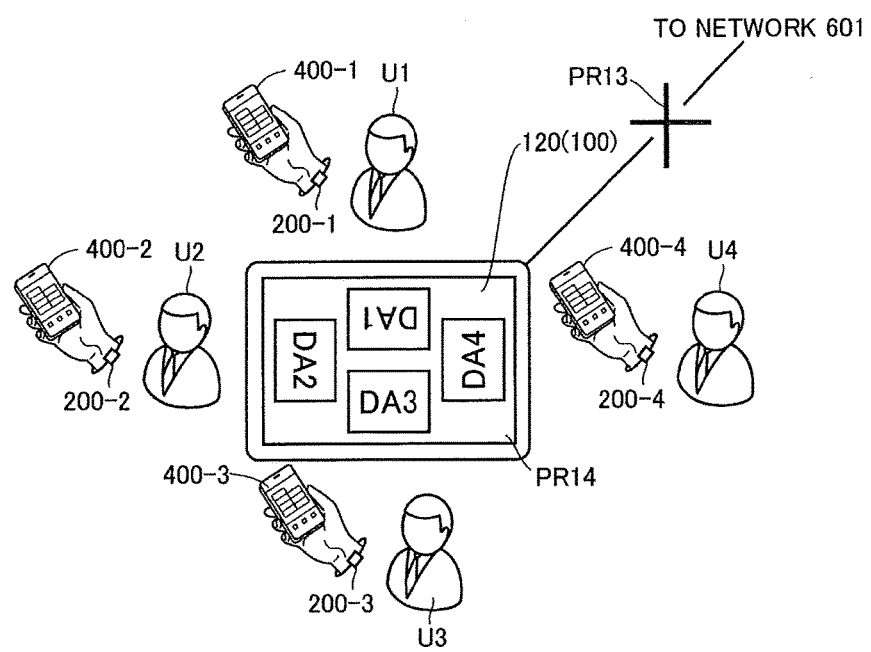

FIGS. 12 and 13 schematically show the behavior of the meeting system at the start of the meeting, according to the embodiment of this invention.

Referring to FIG. 12, the present clock time comes a predetermined time before the scheduled start time and date of the meeting (for example, 30 minutes before the start), MFP 100-1 determines seats of meeting attendees so that the seating layout for the attendees takes account of the attributes of the attendees. MFP 100-1 displays the determined seating layout on almost rectangular touch panel display 120, and waits for login process of the attendees (process PR11).

More specifically, MFP 100-1 determines the seating order of the attendees, so that the seats of the attendees with the same attributes are next to each other, and displays images IM1, IM2, IM3 and IM4 which include the attendees' names or the like at the locations of the attendees' seats. Images IM1, IM2, IM3 and IM4 correspond to users U1, U2, U3 and U4, respectively. Images IM1, IM2, IM3 and IM4 are displayed in a mode in which the outer circumference of touch panel display 120 is the bottom and the center of touch panel display 120 is the top (the display mode in the meeting mode).

Next, by executing login processes for user U1, U2, U3, and U4 as the attendees, MFP 100-1 determines whether the behavior state of MFP 100-1 satisfies the initiation condition for the meeting (the condition for beginning to the meeting), or not (process PR12). MFP 100-1 may perform the login process for the attendees based on login information received from biological information terminal 200 via the short distance wireless communication, and may perform the login process for the attendees based on login information input via touch panel display 120. Further, MFP 100-1 may perform the login process for the attendees by executing authentication using face recognition unit 112 or voice recognition unit 113.

In process PR12, when MFP 100-1 completes the login processes for all the attendees, MFP 100-1 determines that the behavior state of MFP 100-1 satisfies the initiation condition for the meeting. MFP 100-1 may determine that the behavior state of MFP 100-1 satisfies the initiation condition for the meeting, when an instruction for starting the meeting from the chairperson is received, when the present clock time reaches the scheduled start time and date described in the meeting information, or the like.

Referring to FIG. 13, when MFP 100-1 determines the behavior state of MFP 100-1 satisfies the initiation condition for the meeting, MFP 100-1 blocks connection to network 601 (process PR13). Herewith, MFP 100-1 works standalone, until the meeting ends (except when meeting is interrupted).

In process PR13, as substitute for blocking connection to network 601, MFP 100-1 may allow all external devices (for example, biological information terminals 200, meeting management server 300, portable terminal devices 400, terminals 500, and so on) connected to network 601 to transmit data to MFP 100-1, and prohibit transmitting data stored in MFP 100-1 from MFP 100-1 to any of external devices connected to network 601.

Next, when encrypted material data (the data which corresponds to data ZA1, ZA2, ZA3 and ZA4 in FIG. 9) is stored in folders "user U1", "user U2", "user U3" and "user U4" in the folder "0025" corresponding to the meeting to be started, MFP 100-1 decrypts the data, and displays the acquired materials DA1, DA2, DA3, and DA4 on touch panel display 120 (process PR14). Each of materials DA1, DA2, DA3, and DA4 is displayed at the location as the corresponding attendee's seat, in the direction similar to each of images IM1, IM2, IM3, and IM4.

In this manner, after blocking connection to network 601, the data is decrypted to acquire materials DA1, DA2, DA3, and DA4. Hence, it is possible to prevent the situation in which a person other than the attendees views materials DA1, DA2, DA3, and DA4.

Users U1, U2, U3, and U4 hold the meeting by using MFP 100-1. Each of users U1, U2, U3, and U4 can turns a page of his/her material and write characters or the like on his/her material, by operating touch panel display 120, as needed basis.

Figure 14:
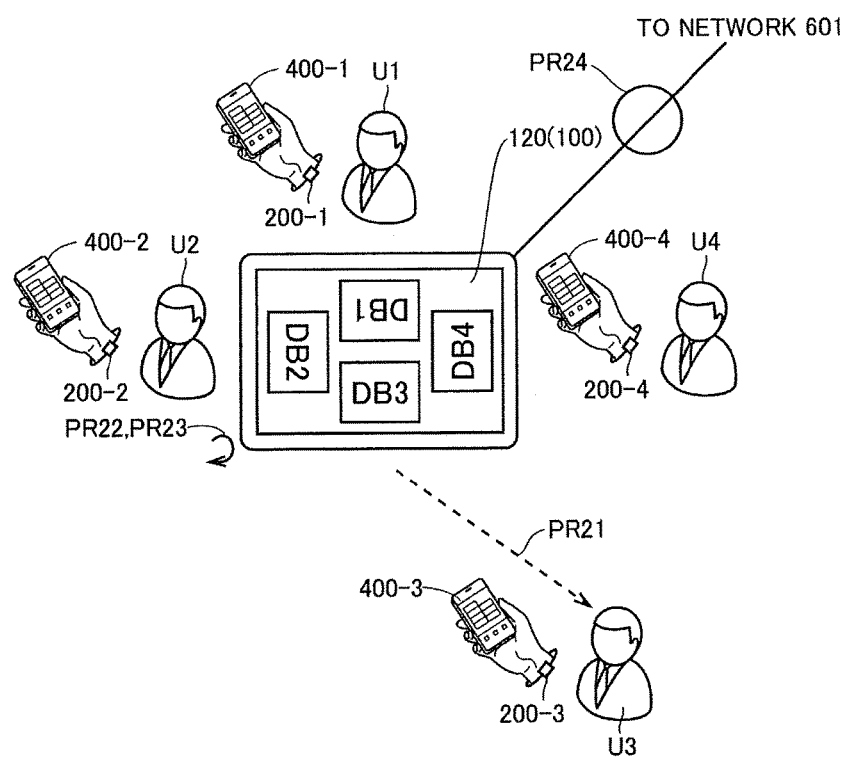
FIG. 14 schematically shows the behavior of the meeting system, when the meeting is suspended, according to the embodiment of this invention.

FIG. 14 schematically shows the behavior of the meeting system, when the meeting is suspended, according to the embodiment of this invention.

Referring to FIG. 14, after process PR14, MFP 100-1 determines whether the behavior state of MFP 100-1 satisfies the interruption condition for the meeting (the condition for interrupting the meeting), or not. When an operation to interrupt the meeting is received from at least the meeting chairperson among the attendees via touch panel display 120, or when at least one person among the attendees left the seat, MFP 100-1 determines the behavior state of MFP 100-1 satisfies the interruption condition for the meeting (process PR21). Leaving the seat of the attendees may be detected by interruption of the short distance wireless communication being performed with biological information terminal 200 which is worn by the attendee. Leaving the seat of the attendees may be detected by interruption of the state in which face recognition unit 112 recognizes the attendee's face, or the location information of portable terminal device 400 possessed by the attendee.

It is supposed that materials DB1, DB2, DB3, and DB4 are displayed on touch panel display 120, at the time point when MFP 100-1 satisfies the interruption condition for the meeting. Materials DB1, DB2, DB3, and DB4 correspond to materials DA1, DA2, DA3, and DA4 revised (for example, to which notes were added) from the time point of the beginning of the meeting, for example.

When MFP 100-1 determines that the interruption condition of the meeting is satisfied, MFP 100-1 stops displaying material DB3 (an example of data being used at the meeting) for the user (user U3 in this example) who left the seat, at the interruption time. MFP 100-1 encrypts and stores the data of material DB3 (process PR22). MFP 100-1 may encrypt and store data of materials DB1, DB2, DB3, and DB4 for all the meeting attendees. Each of users U1, U2, and U4 who is present when the meeting is interrupted may store each of materials DB1, DB2, and DB4 into portable terminal device 400 by his/her operation when the meeting is interrupted, in case that they want to continuously use each of materials DB1, DB2, and DB4 when the meeting is restarted.

Next, MFP 100-1 records the clock time of the interruption in storage device 103, and sets an interruption flag (process PR23). MFP 100-1 moves to the cancel process which will be explained later, in case that the meeting is not restarted (in case that the interruption flag is set), after a predetermined time (for example, 1 hour) has elapsed from the interruption beginning time.

Next, MFP 100-1 resets (initializes) all the data relates to the meeting stored in memory (RAM) 107, and restores the connection to network 601 (process PR24). Herewith, data transmission from MFP 100-1 to external devices connected to network 601 becomes available.

In this manner, by restoring the connection to network 601 after material DB3 of user U3 left the seat was encrypted, MFP 100-1 can be used from external devices on network 601 when the meeting is interrupted, and it is possible to prevent the situation in which a person other than the attendees views materials DB1, DB2, DB3, and DB4.

Figure 15:
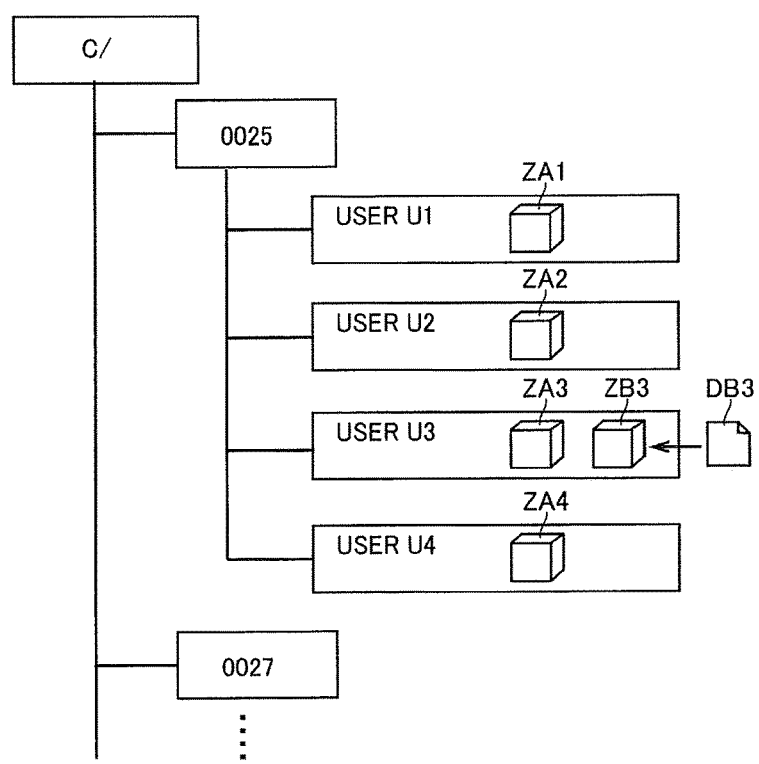
FIG. 15 is for explanation pertaining to process PR22 of FIG. 14 in detail, according to the embodiment of this invention.

FIG. 15 is for explanation pertaining to process PR22 of FIG. 14 in detail, according to the embodiment of this invention.

Referring to FIG. 15, in process PR22, when MFP 100-1 determines the interruption condition of the meeting is satisfied, MFP 100-1 encrypts the data of material DB3 for the user (user U3 in this example) who left the seat at the interruption time. Next, MFP 100-1 stores encrypted data ZB3 in folder "user U3" in folder "0025" corresponding to the ongoing meeting.

In process PR22, material data of all the attendees at the interruption time may be encrypted, and the encrypted data may be stored.

Figure 16:
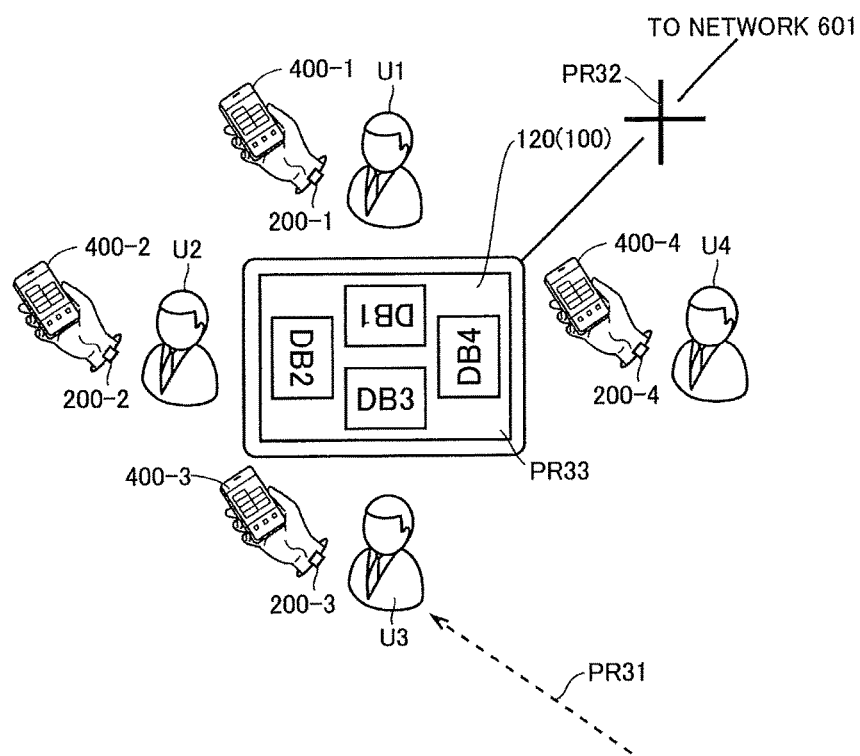
FIG. 16 schematically shows the behavior of the meeting system at the restart of the meeting, according to the embodiment of this invention.

FIG. 16 schematically shows the behavior of the meeting system at the restart of the meeting, according to the embodiment of this invention.

Referring to FIG. 16, after process PR22, MFP 100-1 determines whether the behavior state of MFP 100-1 satisfies the meeting restart condition (the condition for restarting the meeting) or not. When the meeting restart operation was received from at least the meeting chairperson among the attendees via touch panel display 120, or the attendee who left the seat is seated, MFP 100-1 determines that the meeting restart condition is satisfied (process PR31). The seating of the attendee who left the seat is detected by reestablishment of the short distance wireless communication with biological information terminal 200 wore by the attendee left the seat, for example.

When MFP 100-1 determines that the meeting restart condition is satisfied, MFP 100-1 blocks the connection to network 601 (process PR32). In process PR32, as substitute for blocking connection to network 601, MFP 100-1 may allow external devices (for example, biological information terminals 200, meeting management server 300, portable terminal devices 400, terminals 500, and so on) connected to network 601 to transmit data to MFP 100-1, and prohibit transmitting data stored in MFP 100-1 from MFP 100-1 to external devices connected to network 601. MFP 100-1 may prohibit transmitting data stored in MFP 100-1 to external devices connected to network 601 not associated with at least the meeting attendees, by operations of the meeting attendees.

Next, MFP 100-1 decrypts data ZB3 (FIG. 15) in the folder "user U3" in the folder "0025" corresponding to the ongoing meeting, and displays the acquired material DB3 on touch panel display 120 (process PR33). When MFP 100-1 encrypted and stored data of materials DB1, DB2, DB3, and DB4 for all the meeting attendees, MFP 100-1 may decrypt the encrypted data for all the meeting attendees, and display the acquired materials DB1, DB2, DB3, and DB4 on touch panel display 120. Each of users U1, U2, and U4 present when the meeting is interrupted may display each of materials DB1, DB2, and DB4 stored in portable terminal devices 400 on touch panel display 120, by his/her operation.

In this manner, when the meeting is restarted, after blocking the connection to network 601, data is decrypted and material DB3 is acquired. Hence, it is possible to prevent the situation in which a person other than the attendees views material DB3 for the attendee left the seat, while the meeting is interrupted.

Figure 17:
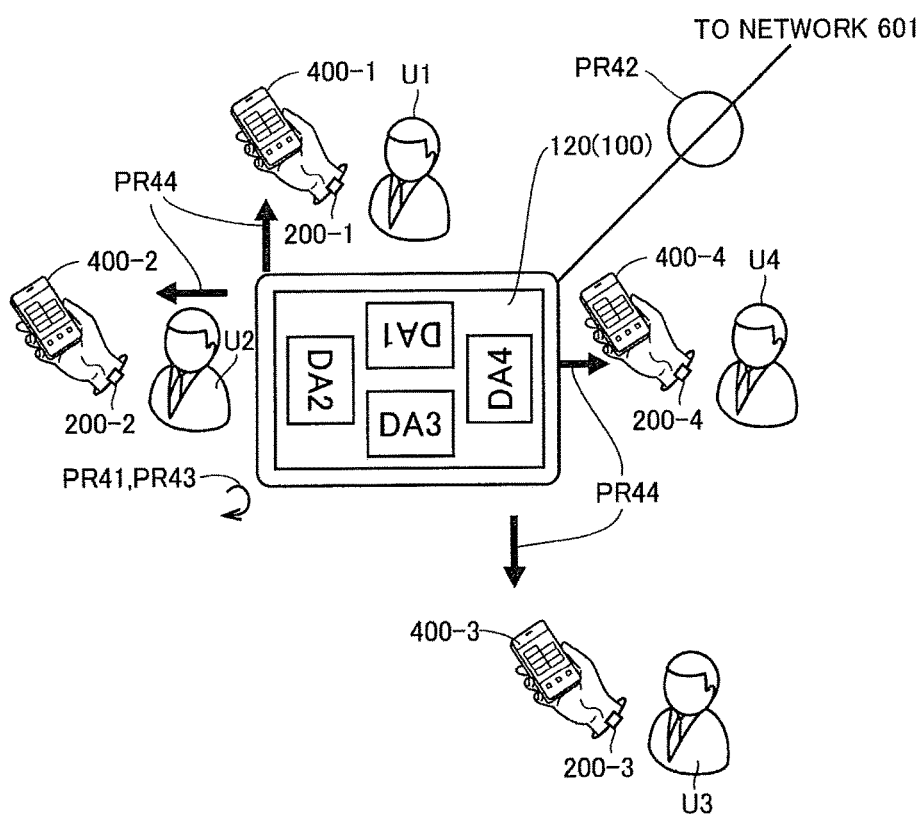
FIG. 17 schematically shows the behavior of the meeting system, when the meeting is canceled, according to the embodiment of this invention.

FIG. 17 schematically shows the behavior of the meeting system, when the meeting is canceled, according to the embodiment of this invention.

Referring to FIG. 17, MFP 100-1 determines that the meeting cancel condition is satisfied (process PR41), when an operation for cancelling the meeting is received form at least one of the attendees via touch panel display 120, or the meeting is not restarted (the interruption flag is set) after a predetermined time (for example, 1 hour) has elapsed from the interruption beginning time of the meeting.

When MFP 100-1 determines that the meeting cancel condition is satisfied, MFP 100-1 resets (initializes) all the data relates to the meeting stored in memory (RAM) 107, and restores the connection to network 601 (process PR42).

Next, when the expiration date configured to encrypted data ZA1, ZA2, ZA3, and ZA4 (the expiration date set in process PR6 of FIG. 6) is reached, MFP 100-1 deletes encrypted data ZA1, ZA2, ZA3, and ZA4 (process PR43), and informs the fact of the deleting to external devices (portable terminal devices 400 or the like) associated with users U1, U2, U3, and U4 who are the attendees (process PR44).

Figure 18:
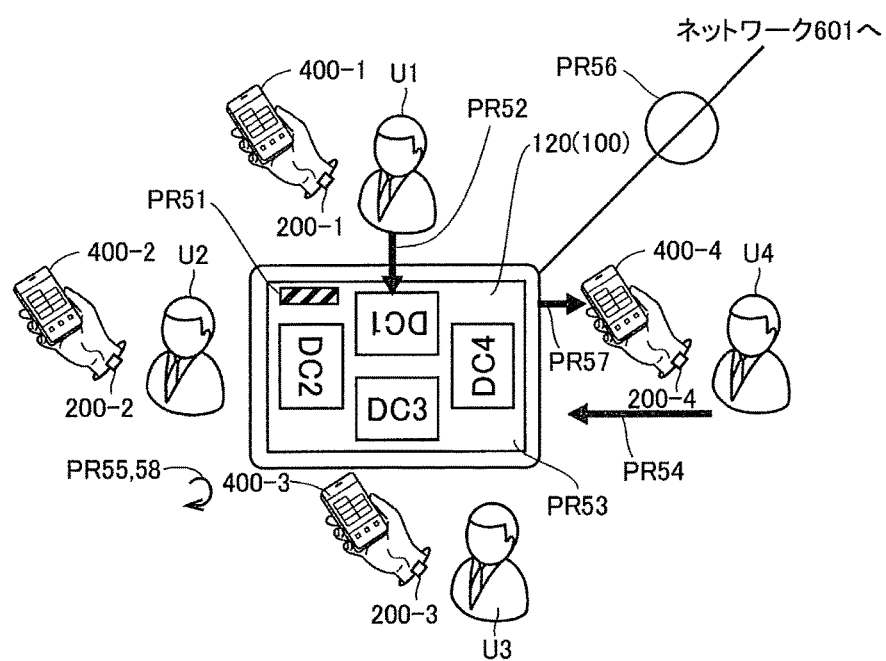
FIG. 18 schematically shows the behavior of the meeting system at the end of the meeting, according to the embodiment of this invention.

FIG. 18 schematically shows the behavior of the meeting system at the end of the meeting, according to the embodiment of this invention.

Referring to FIG. 18, when the present clock time reaches the scheduled end time and date of the meeting, MFP 100-1 displays alert warning to urge the end of the meeting at the location of the seat of user U1 who is the chairperson, on touch panel display 120 (process PR51), and determines whether the behavior state of MFP 100-1 satisfies the meeting end condition or not.

When MFP 100-1 receives an operation to end the meeting from user U1, MFP 100-1 determines that the behavior state of MFP 100-1 satisfies the meeting end condition (process PR52). At this time, MFP 100-1 may accept the meeting continue operation from user U1. In this instance, MFP 100-1 may display alert warning again after a lapse of a predetermined time. When the scheduled end time and date of the meeting is reached, MFP 100-1 may determine that the behavior state of MFP 100-1 satisfies the meeting end condition.

It is supposed that materials DC1, DC2, DC3 and DC4 are displayed on touch panel display 120 at the time point when MFP 100-1 receives the operation to end the meeting. Materials DC1, DC2, DC3 and DC4 correspond to materials DA1, DA2, DA3, and DA4 revised (for example, to which notes were added) from the time point of the beginning of the meeting, for example.

When MFP 100-1 determines that the behavior state of MFP 100-1 satisfies the meeting end condition, MFP 100-1 asks user U1 via touch panel display 120 whether material DC1 of user U1 at the end time point should be transmitted to portable terminal device 400 or the like possessed by user U1, or not. MFP 100-1 asks each of users U2, U3, and U4 whether each of materials DC2, DC3, and DC4 should be transmitted or not, in a similar manner (process PR53).

User U4 who is the attendee wishes to transmit the material performs an operation to request the transmitting via touch panel display 120 (process PR54). At this time, MFP 100-1 may accept an operation to configure the transmitting method with the request.

When MFP 100-1 receives an operation to request the transmitting from user U4, MFP 100-1 encrypts and stores material DC4 of user U4 (process PR55).

Next, MFP 100-1 resets (initializes) all the data which relates to the meeting stored in memory (RAM) 107, and restores the connection to network 601 (process PR56).

After the connection to network 601 was restored, MFP 100-1 transmits the encrypted data to portable terminal device 400-4 of user U4 via network 601 (process PR57).

After that, MFP 100-1 erases all the data which relates to the finished meeting (process PR58).

Figure 19:
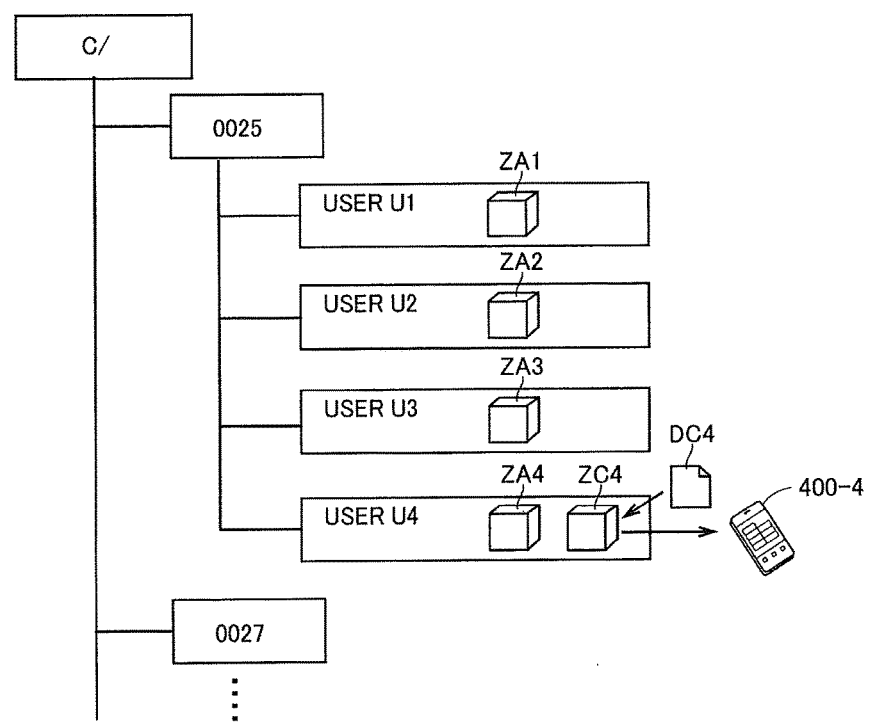
FIG. 19 is for explanation pertaining to processes PR55 and PR57 of FIG. 18 in detail, according to the embodiment of this invention.

FIG. 19 is for explanation pertaining to processes PR55 and PR57 of FIG. 18 in detail, according to the embodiment of this invention.

Referring to FIG. 19, in process PR55, when MFP 100-1 receives an operation to request the transmitting from user U4, MFP 100-1 encrypts material DC4 to generate data ZC4. Then, MFP 100-1 stores encrypted data ZC4 in the folder "user U4" in the folder "0025".

In process PR57, MFP 100-1 transmits data ZC4 to portable terminal device 400-4 for user U4, via network 601.

In this manner, it is possible to prevent the situation in which material before encryption leaks out from MFP 100-1 to the outside after connecting to the network 601, by encrypting and storing the material when an operation to request transmitting the meeting material was accepted.

MFP 100-1 may transmit the attendees' material to portable terminal devices 400 without network 601, by using short distance wireless communication or the like. In this instance, before the connection to network 601 is restored, MFP 100-1 may transmit the attendees' material to portable terminal devices 400 without encryption, and delete the attendees' material after the transmitting. In this instance, it is possible to prevent the situation in which the material leaks out from MFP 100-1 to the outside after connecting to the network 601.

Figure 20:
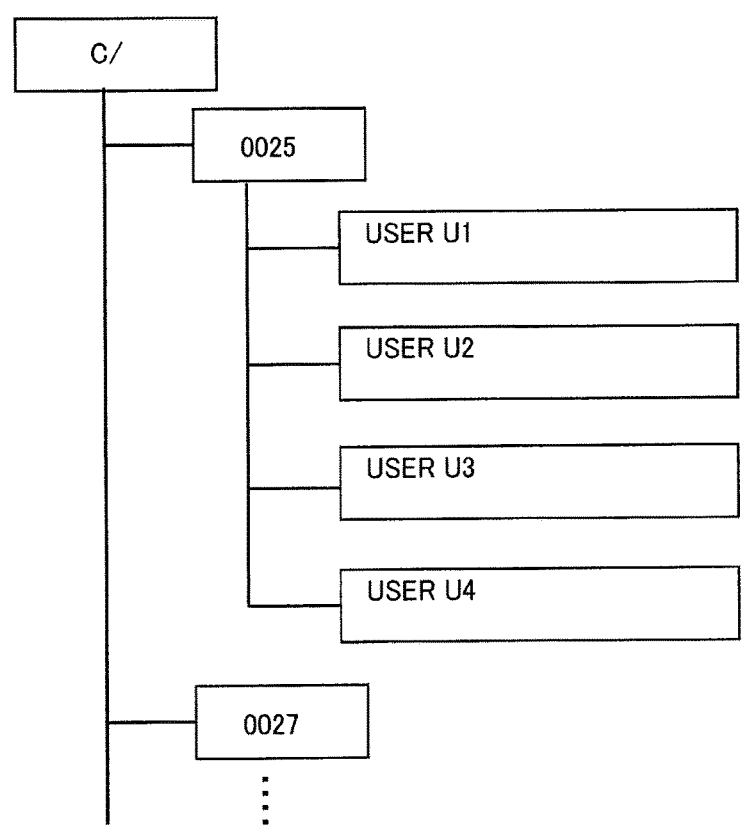
FIG. 20 is for explanation pertaining to process PR58 of FIG. 18 in detail, according to the 100 embodiment of this invention.

FIG. 20 is for explanation pertaining to process PR58 of FIG. 18 in detail, according to the embodiment of this invention.

Referring to FIG. 20, in process PR58, MFP 100-1 deletes all the data in folders "user U1", "user U2", "user U3", and "user U4" in the folder "0025". MFP 100-1 may delete the folder "0025" itself.

In this manner, it is possible to prevent the situation in which the data leaks out after the meeting was finished from MFP 100-1 to the outside, by deleting the data after the meeting was finished.

Figure 21:
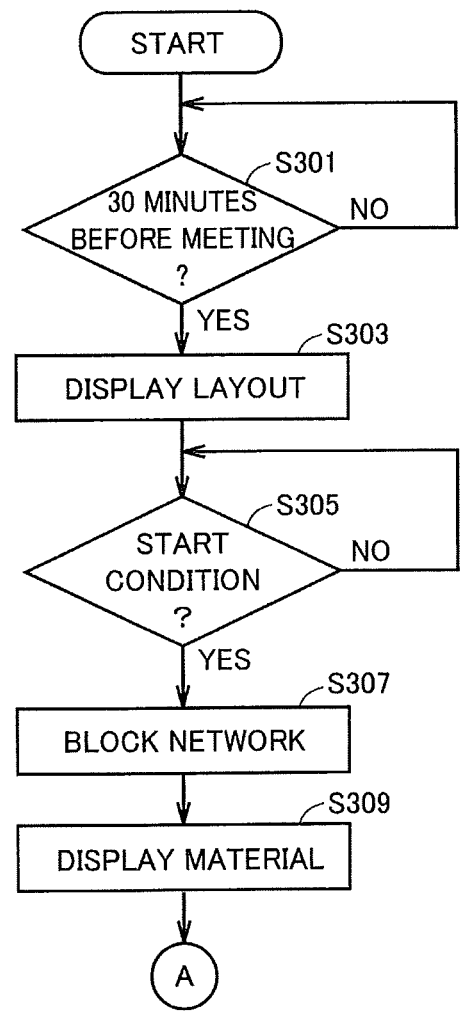
FIG. 21 shows the first part of a flowchart which indicates the behavior of MFP 100 at the time of the meeting, according to the embodiment of this invention.
Figure 22:
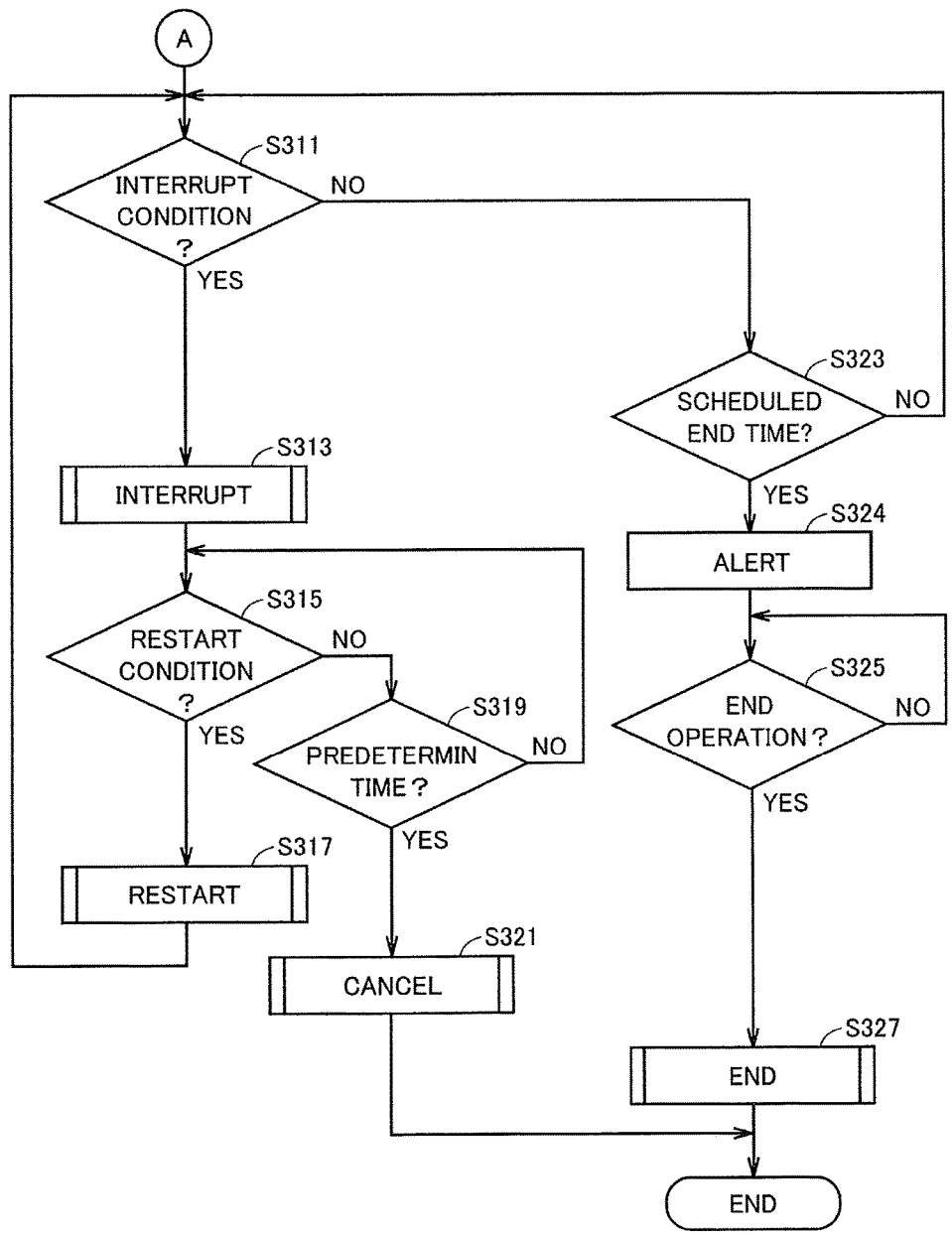
FIG. 22 shows the second part of the flowchart which indicates the behavior of MFP 100 at the time of the meeting, according to the embodiment of this invention.

FIGS. 21 and 22 show a flowchart which indicates the behavior of MFP 100 at the time of the meeting, according to the embodiment of this invention. This flowchart is executed based on the application 123 for meeting administration.

Referring to FIG. 21, CPU 102 of MFP 100 determines whether the present clock time reaches 30 minutes before the scheduled start time and date of the meeting stored in the individual reservation table 121 or not (S301). Until it determines that the present clock time reaches 30 minutes before the scheduled start time and date of the meeting stored in the individual reservation table 121, CPU 102 continues the process of step S301.

At step S301, when it is determined that the present clock time reaches 30 minutes before the scheduled start time and date (YES at S301), CPU 102 displays the seating layout of the attendees on touch panel display 120 (S303).

Next, CPU 102 determines whether the initiation condition for the meeting is satisfied or not (S305). Until it determines that the initiation condition for the meeting is satisfied, CPU 102 continues the process of step S305.

At step S305, when it is determined that the initiation condition for the meeting is satisfied (YES at S305), CPU 102 blocks the connection to network 601 (S307). Next, when encrypted material is stored in any of the attendee's folders which relate to the meeting, CPU 102 decrypts and displays the material (S309), and steps in the process of step S311 in FIG. 22.

Referring to FIG. 22, at step S311, CPU 102 determines whether the interruption condition of the meeting is satisfied or not (S311).

At step S311, when it is determined that the interruption condition of the meeting is satisfied (YES at S311), CPU 102 executes interruption processes which will be explained later (S313). Next, CPU 102 determines whether the meeting restart condition is satisfied or not (S315).

At step S315, when it is determined that the meeting restart condition is satisfied (YES at S315), CPU 102 executes restart process which will be explained later (S317), and steps in the process of step S311.

At step S315, when it is not determined that the meeting restart condition is satisfied (NO at S315), CPU 102 determines whether a predetermined time has been elapsed after the meeting was interrupted or not (S319).

At step S319, when it is not determined that a predetermined time has been elapsed after the meeting was interrupted (NO at S319), CPU 102 steps in the process of step S315.

At step S319, when it is determined that a predetermined time has been elapsed after the meeting was interrupted (YES at S319), CPU 102 executes the cancel process which will be explained later (S321), and terminates the process.

At step S311, when it is not determined that the interruption condition of the meeting is satisfied (NO at S311), CPU 102 determines whether the present time and date reaches the scheduled end time and date of the meeting or not (S323).

At step S323, when it is not determined that the present time and date reaches the scheduled end time and date of the meeting (NO at S323), CPU 102 steps in the process of step S311.

At step S323, when it is determined that the present time and date reaches the scheduled end time and date of the meeting (YES at S323), CPU 102 displays alert warning to urge the meeting end (S324), and determines whether an operation to end the meeting is received or not (S325). Until it determines that an operation to end the meeting is received, CPU 102 continues the process of step S325.

At step S325, when it is determined that an operation to end the meeting is received (YES at S325), CPU 102 executes the end process which will be explained later (S327), and terminates the process.

Figure 23:
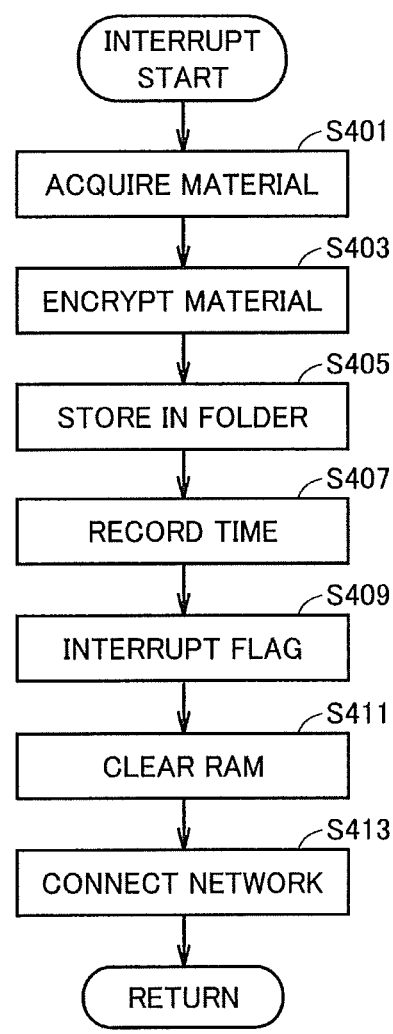
FIG. 23 shows a subroutine of the interruption process of step S313 in FIG. 22.

FIG. 23 shows a subroutine of the interruption process of step S313 in FIG. 22.

Referring to FIG. 23, in the interruption process, CPU 102 acquires material of the attendees who left the seats at the interruption (S401), and encrypts the acquired material (S403). Next, CPU 102 stores the data of the encrypted material in folders of users who left the seats (S405). Next, CPU 102 records clock time at which the meeting was interrupted (S407), and sets an interruption flag (S409). Next, CPU 102 clears the RAM (S411), restores the connection to network 601 (S413), and returns to the main flowchart.

Figure 24:
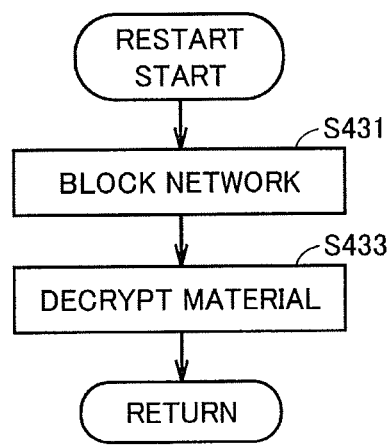
FIG. 24 shows a subroutine of the restart process of step S317 in FIG. 22.

FIG. 24 shows a subroutine of the restart process of step S317 in FIG. 22.

Referring to FIG. 24, in the restart process, CPU 102 blocks the network (S431), decrypts and displays the stored material (S433), and returns to the main flowchart.

Figure 25:
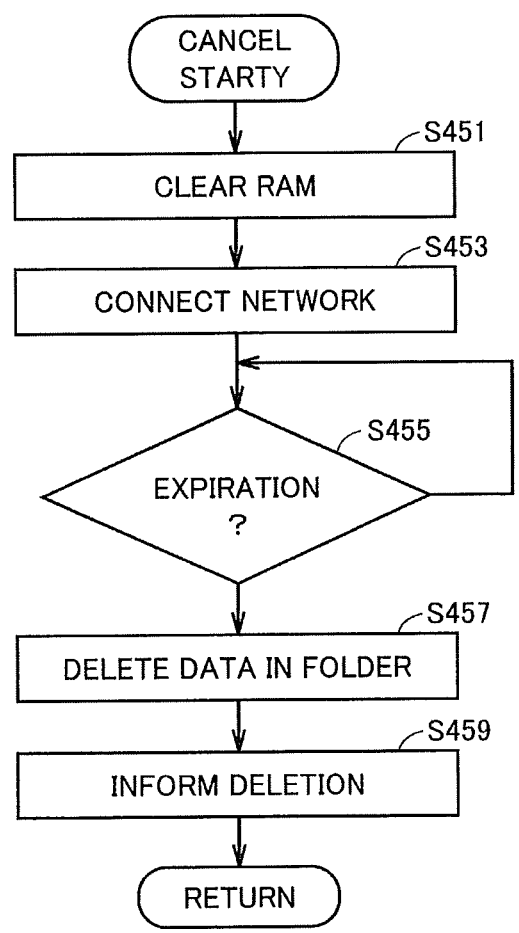
FIG. 25 shows a subroutine of the cancel process of step S321 in FIG. 22.

FIG. 25 shows a subroutine of the cancel process of step S321 in FIG. 22.

Referring to FIG. 25, in the cancel process, CPU 102 clears the RAM (S451), and connects to network 601 (S453). Further, CPU 102 determines whether the expiration date for data stored in the folder of the meeting is reached or not (S455). Until it is determined that the expiration date for the data stored in the folder of the meeting is reached, CPU 102 continues the process of step S455.

At step S455, when it is determined that the expiration date for the data stored in the folder of the meeting is reached (YES at S455), CPU 102 deletes the data in the folder (S457), informs the attendees about the fact of the deletion (S459), and returns to the main flowchart.

Figure 26:
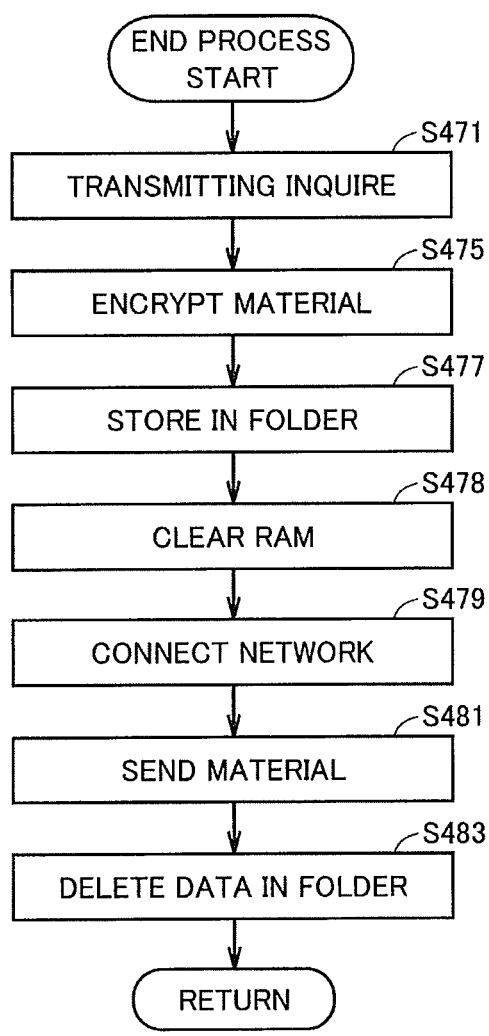
FIG. 26 shows a subroutine of the end process of step S327 in FIG. 22.

FIG. 26 shows a subroutine of the end process of step S327 in FIG. 22.

Referring to FIG. 26, in the end process, CPU 102 inquires about necessity for transmitting of each of the attendees' materials at the end time point (S471), encrypts the material of which the attendee requests the transmitting (S475), and stores the encrypted data in the attendee's folder (S477). Next, CPU 102 clears the RAM (S478), and connects to network 601 (S479). Further, CPU 102 transmits the encrypted material (S481), deletes the data in the folder (S483), and returns to the main flowchart.

According to this embodiment, MFP 100-1 blocks the connection to network 601 during the meeting, to isolate MFP 100-1. Herewith, a case in which the data which relates the meeting leaks out from MFP 100-1 to external devices on network 601 can be avoided, so that security can be improved when MFP 100-1 is used at a meeting.

The embodiment is especially effective when a person outside the company is included in the meeting attendees. More specifically, it is supposed that a person outside the company is concerned about leakage of his/her material to equipments on network 601 via MFP 100-1 due to misoperation or the like, when holding a meeting with displaying material which includes secret information of his/her company on touch panel display 120. According to this embodiment, material leakage can be avoided, a sense of security with respect to MFP 100-1 can be given to a person outside the company.

[Modification]

Figure 27:
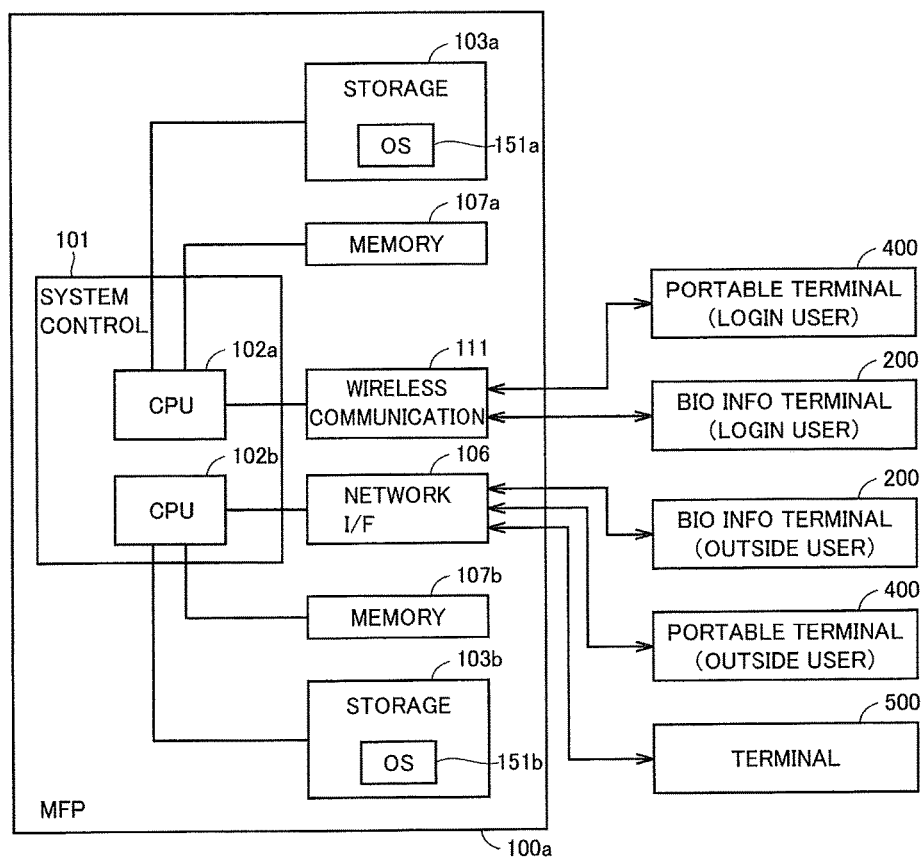
FIG. 27 shows a block diagram indicating a hardware configuration of MFP 100, according to a 110 modification of the embodiment of this invention.

FIG. 27 shows a block diagram indicating a hardware configuration of MFP 100, according to a modification of the embodiment of this invention.

Referring to FIG. 27, MFP 100a of this modification has a structure corresponding to one of MFPs 100-1 and 100-2 in FIG. 1, and is equipped with two storage devices 103a and 103b and two memories 107a and 107b. System controller 101 includes two CPUs 102a and 102b. Storage device 103a stores an OS (Operating System) 151a. Storage device 103b stores an OS 151b.

Storage devices 103a and 103b may be two storing areas in a physical storage device divided. Memories 107a and 107a may be two storing areas in a physical RAM and ROM divided.

According to this modification, the behavior of MFP 100-1 when holding a meeting by using MFP 100-1 which is one of MFPs 100a will be explained. When it is determined that the initiation condition for the meeting is satisfies, MFP 100-1 is restarted by control of an application 123 for meeting administration. After the restart, each of CPU 102a and CPU 102b works by the AMP (Asymmetric Multiprocessing) method.

More specifically, OS 151a is assigned to CPU 102a and memory 107a. OS 151a controls the behavior of MFP 100-1 for the meeting. On the other hand, OS151b is assigned to CPU 102b and memory 107b. OS 151b controls the behavior of MFP 100-1 other than the meeting (for example, the print function, the scan function, and the facsimile function). OS 151a and OS 151b work in parallel, without sharing the CPU and the memory.

Wireless communication control unit 111 works on OS 151a. Wireless communication control unit 111 allows data sending and receiving only by the direct wireless communication (the access point mode) without network 601 (without a relay device such as access point 602 (FIG. 1)), with biological information terminals 200 and portable terminal devices 400 associated with the meeting attendees. Herewith, the data of the meeting can be transmitted and received via direct wireless communication between biological information terminals 200 or portable terminal devices 400 possessed by the attendees and MFP 100-1, during the meeting. On the other hand, transmitting of the data relevant to the meeting from MFP 100-1 to external devices connected to network 601 (external devices not associated with the attendees) is prohibited.

Network interface 106 works on OS 151b, and is separated from the meeting system at the OS level. Network interface 106 allows communication between external devices connected to network 601 and MFP 100-1 during the meeting. Herewith, data transmitting is enabled to external devices connected to network 601 (external devices not associated with the attendees) by an operation of the user of the external device who is other than the meeting attendees.

At the meeting end, MFP 100-1 is restarted by control of application 123 for meeting administration. After the restart, MFP 100-1 clears memory 107a, and releases wireless communication control unit 111 to all users.

According to this modification, network 601 is invisible from the environment of the meeting attendees (for example, from touch panel display 120), and network 601 can not be accessed. In consequence, it is possible to prevent the situation in which the data which relates the meeting leaks out to network 601 by the attendees' misoperation or the like. On the other hand, the environment which includes memory 107a used for the meeting is invisible from users other than the meeting attendees, and the environment which includes memory 107a used for the meeting can not be accessed.

Since the structure and behavior other than the above mentioned meeting system in this modification are similar to the above mentioned embodiment, the explanations are not repeated.

According to this modification, it is possible to prevent the situation in which the data which relates the meeting stored in MFP 100-1, biological information terminals 200 of the attendees, or portable terminal devices 400 of the attendees leaks out onto network 601, and MFP 100-1 can be operated by users other than the meeting attendees during the meeting.

[Others]

In the above mentioned embodiment, MFP 100-1 only needs to prohibit transmitting data stored in MFP 100-1 to external devices connected to network 601, not associated to at least the meeting attendees, by operations of the meeting attendees, when it is determined that the behavior state of MFP 100-1 satisfies a predetermined condition which relates to the meeting. MFP 100-1 may determine the relevance between the meeting attendees and external devices, based on the following user information table 122, for example.

FIG. 28 schematically shows user information table 122 stored in MFP 100-1, according to the embodiment of this invention.

Referring to FIG. 28, user information table 122 records information relates to users who can use MFP 100-1. User information table 122 includes information of user names who can use MFP 100-1, passwords, IP addresses of biological information terminals wore, and IP addresses of possessed portable terminal devices.

Concretely, user information table 122 shown in FIG. 28 discloses user U1 has user ID "001" and password "smi129", wears biological information terminal 200-1 of which the IP address is "192.168.1.6", and possesses portable terminal device 400-1 of which the IP address is "192.168.1.23". The information is input by an administrator of MFP 100-1 or the like.

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet. The processes explained in the above flowcharts and the description are executed by a CPU in line with the program.

Although the present invention has been described and illustrated in detail, it is clearly understood that the same is by way of illustrated and example only and is not to be taken by way limitation, the scope of the present invention being interpreted by terms of the appended claims.

According to this invention, an image processing device and a control program of an image processing device improves the security can be provided.

What is claimed is:

1. An image processing device which can communicate with an external device via a network, comprising a hardware processor that:
   determines whether a behavior state of the image processing device satisfies a predetermined condition which relates to a meeting, and
   prohibits transmitting data stored in the image processing device to the external device connected to the network, not associated with at least attendees of the meeting, by an operation of the meeting attendees, when it is determined that the behavior state of the image processing device satisfies the predetermined condition which relates to the meeting,
   wherein the data stored in the image processing device is permitted to be transmitted to the external device connected to the network when it is determined that the behavior state of the image processing device satisfies the predetermined condition which relates to the meeting and the external device is associated with at least attendees of the meeting.

2. The image processing device according to claim 1, wherein
   the predetermined condition which relates to the meeting is a condition to start the meeting.

3. The image processing device according to claim 1, wherein the hardware processor
   acquires information which relates to the meeting, and
   determines whether the behavior state of the image processing device satisfies the predetermined condition which relates to the meeting, based on the acquired information.

4. The image processing device according to claim 3, wherein the hardware processor
   acquires login information of participants of the meeting, and
   determines that the behavior state of the image processing device satisfies the predetermined condition which relates to the meeting, when login processes for all the participants of the meeting are completed.

5. The image processing device according to claim 3, wherein the hardware processor
   acquires information of the scheduled start time and date of the meeting, and
   determines that the behavior state of the image processing device satisfies the predetermined condition which relates to the meeting, when the scheduled start time and date of the meeting is reached.

6. The image processing device according to claim 3, wherein the hardware processor
   acquires an instruction to start the meeting from a chairperson of the meeting, and
   determines that the behavior state of the image processing device satisfies the predetermined condition which relates to the meeting, when the instruction to start the meeting is acquired from the chairperson of the meeting.

7. The image processing device according to claim 1, wherein the hardware processor
   prohibits transmitting data stored in the image processing device from the image processing device to all external devices connected to the network, when it is determined that the behavior state of the image processing device satisfies the predetermined condition which relates to the meeting.

8. The image processing device according to claim 7, wherein the hardware processor
   blocks connection between the image processing device and the network, when it is determined that the behavior state of the image processing device satisfies the predetermined condition which relates to the meeting.

9. The image processing device according to claim 1, wherein the hardware processor
   does not prohibit transmitting data stored in the image processing device to the external device connected to the network, not associated with the meeting attendees, by an operation of a user other than the meeting attendees, when it is determined that the behavior state of the image processing device satisfies the predetermined condition which relates to the meeting.

10. The image processing device according to claim 9, wherein the hardware processor
    does not prohibit direct transmitting and receiving data with external devices associated with the meeting attendees without a relay device, when it is determined that the behavior state of the image processing device satisfies the predetermined condition which relates to the meeting.

11. The image processing device according to claim 1, wherein the hardware processor
    acquires data used for the meeting, before it is determined that the behavior state of the image processing device satisfies the predetermined condition which relates to the meeting, and
    encrypts and stores the acquired data, before it is determined that the behavior state of the image processing device satisfies the predetermined condition which relates to the meeting.

12. The image processing device according to claim 11, wherein the hardware processor
    decrypts and displays the stored data, after prohibiting the data transmitting.

13. The image processing device according to claim 1, wherein the hardware processor
    determines whether the behavior state of the image processing device satisfies a condition to end the meeting, after prohibiting the data transmitting, and
    cancels the data transmission prohibition, when it is determined that the behavior state of the image processing device satisfies the condition to end the meeting, and transmitting data stored in the image processing device to an external device connected to the network, not associated with at least attendees of the meeting is prohibited.

14. The image processing device according to claim 13, wherein the hardware processor
    determines that the behavior state of the image processing device satisfies the condition to end the meeting, in the case of at least one of when scheduled end time and date of the meeting is reached, when a predetermined time has elapsed after the meeting interruption without the meeting restart, and when an input necessary is accepted from the chairperson of the meeting.

15. The image processing device according to claim 13, wherein the hardware processor sends data used by the meeting attendees at the meeting to an external device associated with the meeting attendees by the short distance wireless communication without the network, when it is determined that the behavior state of the image processing device satisfies the condition to end the meeting.

16. The image processing device according to claim 13, wherein the hardware processor encrypts and stores data used by the meeting attendees at the meeting, before cancelling the data transmission prohibition, when it is determined that the behavior state of the image processing device satisfies the condition to end the meeting, and sends the stored data to an external device associated with the meeting attendees via the network, after the data transmission prohibition is canceled.

17. An image processing device which can communicate with an external device via a network, comprising a hardware processor that:

determines whether a behavior state of the image processing device satisfies a predetermined condition which relates to a meeting, prohibits transmitting data stored in the image processing device to the external device connected to the network, not associated with at least attendees of the meeting, by an operation of the meeting attendees, when it is determined that the behavior state of the image processing device satisfies the predetermined condition which relates to the meeting, determines whether the behavior state of the image processing device satisfies a condition to interrupt the meeting, after prohibiting the data transmitting, and cancels the data transmission prohibition, when it is determined that the behavior state of the image processing device satisfies the condition to interrupt the meeting.

18. The image processing device according to claim 17, wherein the hardware processor determines that the behavior state of the image processing device satisfies the condition to interrupt the meeting, when accepting input necessary for interruption from at least a chairperson of the meeting.

19. The image processing device according to claim 17, wherein the hardware processor performs short distance wireless communication with external devices associated with the meeting attendees and wore by the meeting attendees, and determines that the behavior state of the image processing device satisfies the condition to interrupt the meeting, when the short distance wireless communication performed with an external device is interrupted.

20. The image processing device according to claim 19, wherein the hardware processor encrypts and stores data being used at the meeting by a user who wears the external device of which the short distance wireless communication was interrupted, before cancelling the data transmission prohibition, when the behavior state of the image processing device satisfies the condition to interrupt the meeting.

21. The image processing device according to claim 20, wherein the hardware processor determines whether the behavior state of the image processing device satisfies a condition to restart the meeting, when the behavior state of the image processing device satisfies the condition to interrupt the meeting, prohibits transmitting data stored in the image processing device to external devices connected to the network, not associated with at least attendees of the meeting by an operation of the meeting attendees, when it is determined that the behavior state of the image processing device satisfies the condition to restart the meeting, and decrypts and displays the stored data, after prohibiting the data transmitting.

22. The image processing device according to claim 21, wherein the hardware processor determines that the behavior state of the image processing device satisfies the condition to restart the meeting, in the case of at least one of when an input necessary to the restart is accepted at least from the chairperson of the meeting, and when the short distance wireless communication with the external device was restarted after interruption of the short distance wireless communication.

23. A non-transitory computer-readable recording medium storing a controlling program for an image processing device which can communicate with an external device via a network, wherein the program causing a computer to:

determines whether a behavior state of the image processing device satisfies a predetermined condition which relates to a meeting, and prohibits transmitting data stored in the image processing device to an external device connected to the network, not associated with at least attendees of the meeting, by an operation of the meeting attendees, when it is determined that the behavior state of the image processing device satisfies the predetermined condition which relates to the meeting, wherein the data stored in the image processing device is permitted to be transmitted to the external device connected to the network when it is determined that the behavior state of the image processing device satisfies the predetermined condition which relates to the meeting and the external device is associated with at least attendees of the meeting.

* * * * *